(12) United States Patent
Nitto

(10) Patent No.: US 10,129,457 B2
(45) Date of Patent: Nov. 13, 2018

(54) CONTROL APPARATUS, METHOD OF CONTROLLING SHOOTING APPARATUS, AND COMPUTER-READABLE STORAGE MEDIUM

(71) Applicant: CANON KABUSHIKI KAISHA, Tokyo (JP)

(72) Inventor: Yuuichi Nitto, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 15/214,527

(22) Filed: Jul. 20, 2016

(65) Prior Publication Data
US 2017/0026566 A1    Jan. 26, 2017

(30) Foreign Application Priority Data

Jul. 24, 2015    (JP) ................................ 2015-147081

(51) Int. Cl.
*H04N 5/232*    (2006.01)
*H04N 5/235*    (2006.01)

(52) U.S. Cl.
CPC ..... *H04N 5/23216* (2013.01); *H04N 5/23203* (2013.01); *H04N 5/23293* (2013.01); *H04N 5/2352* (2013.01); *H04N 5/23212* (2013.01)

(58) Field of Classification Search
CPC .... H04N 5/222; H04N 5/2222; H04N 5/2224; H04N 5/232; H04N 5/23203; H04N 5/23206; H04N 5/23216; H04N 7/00
See application file for complete search history.

(56) References Cited

U.S. PATENT DOCUMENTS

2015/0358513 A1* 12/2015 Yoshino ................. H04N 5/225
348/374

FOREIGN PATENT DOCUMENTS

JP    2013-162178 A    8/2013

* cited by examiner

*Primary Examiner* — Paul Berardesca
(74) *Attorney, Agent, or Firm* — Carter, DeLuca, Farrell & Schmidt LLP

(57) ABSTRACT

A control apparatus includes: an acquisition unit adapted to acquire annotation information input by a user with respect to a first image shot by a shooting unit; a conversion unit adapted to convert the annotation information into a camera command defining an operation of the shooting unit; and an execution unit adapted to cause the shooting unit to execute an operation based on the camera command when shooting a second image shot after the first image.

13 Claims, 31 Drawing Sheets

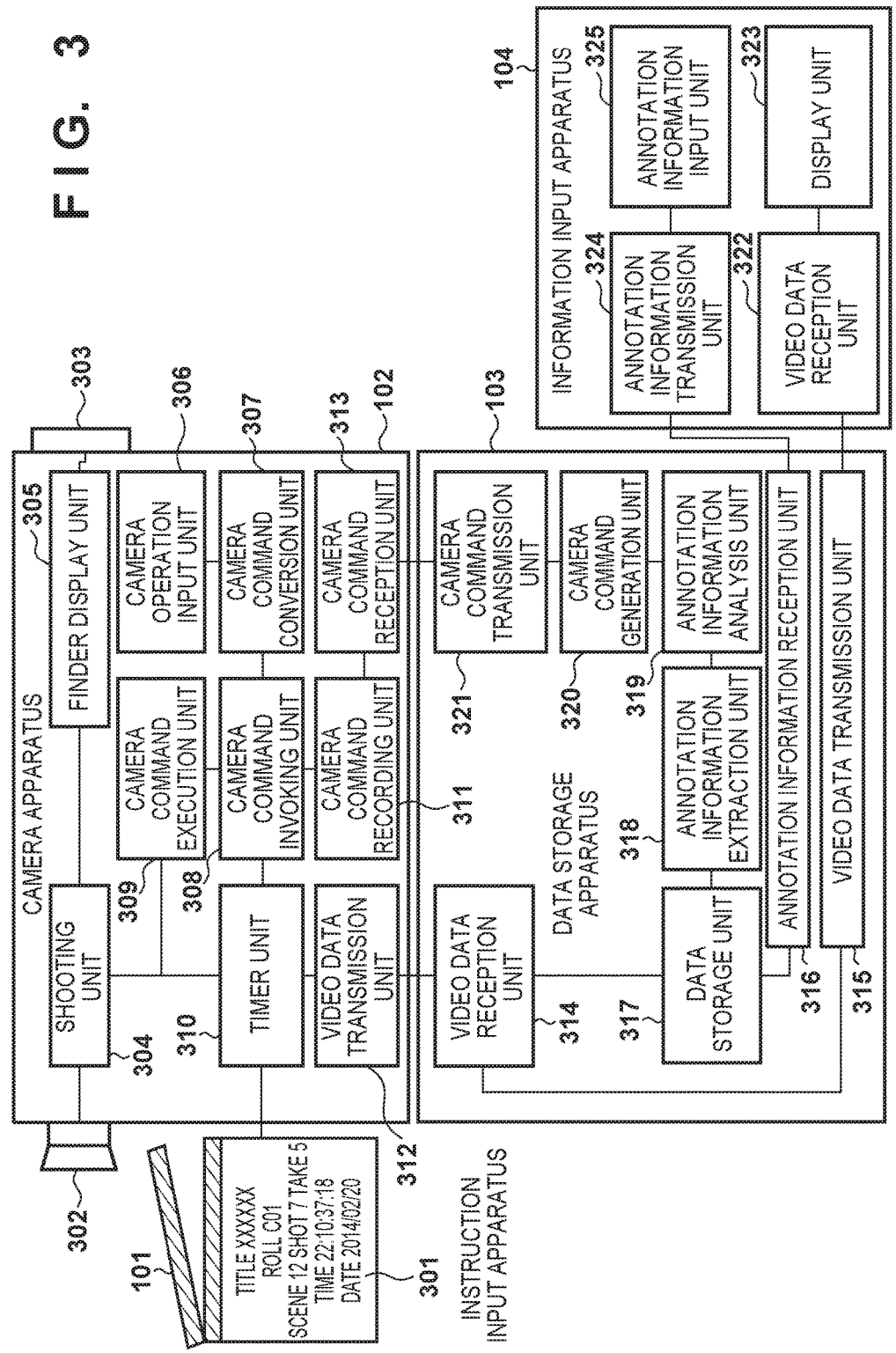

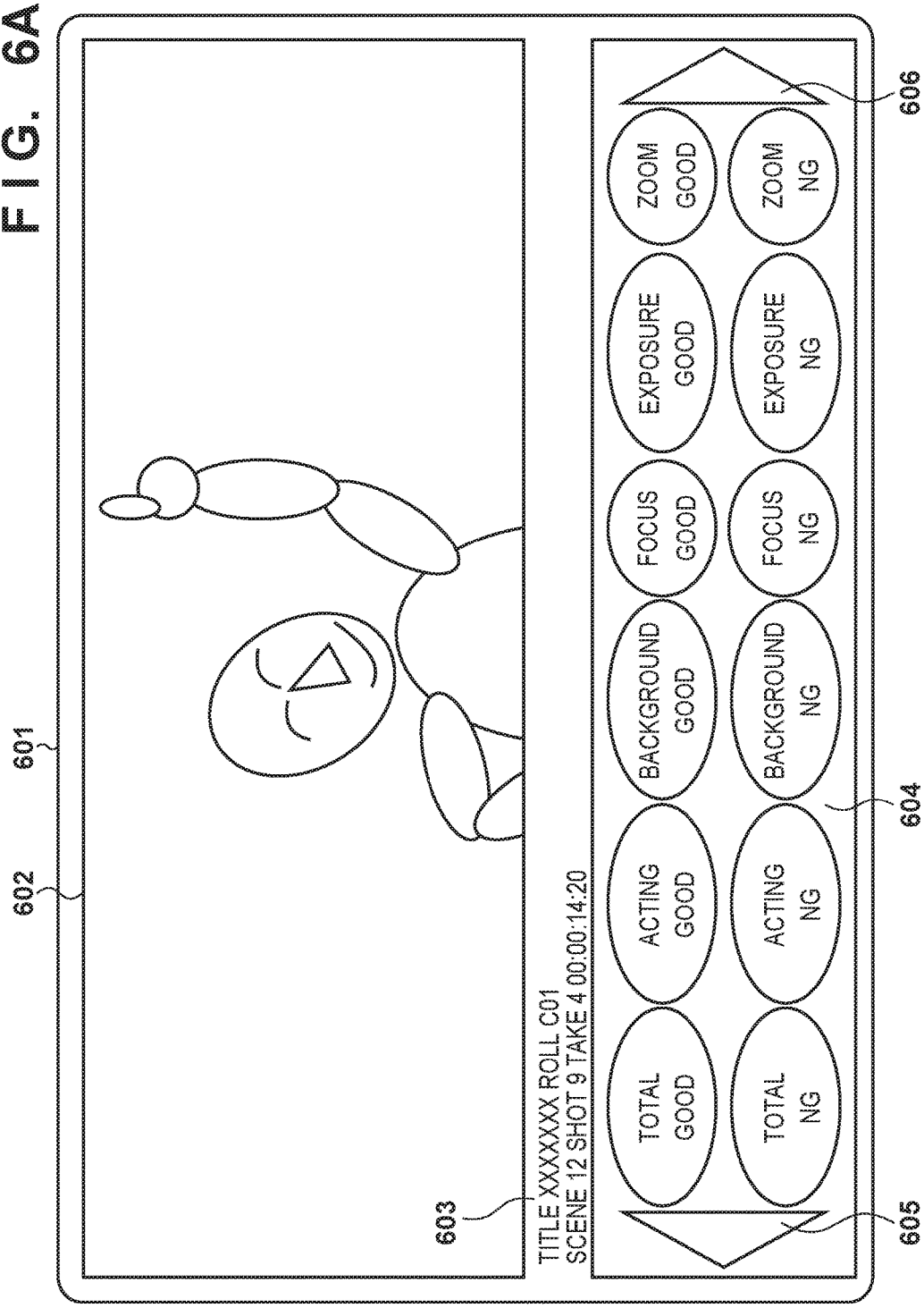

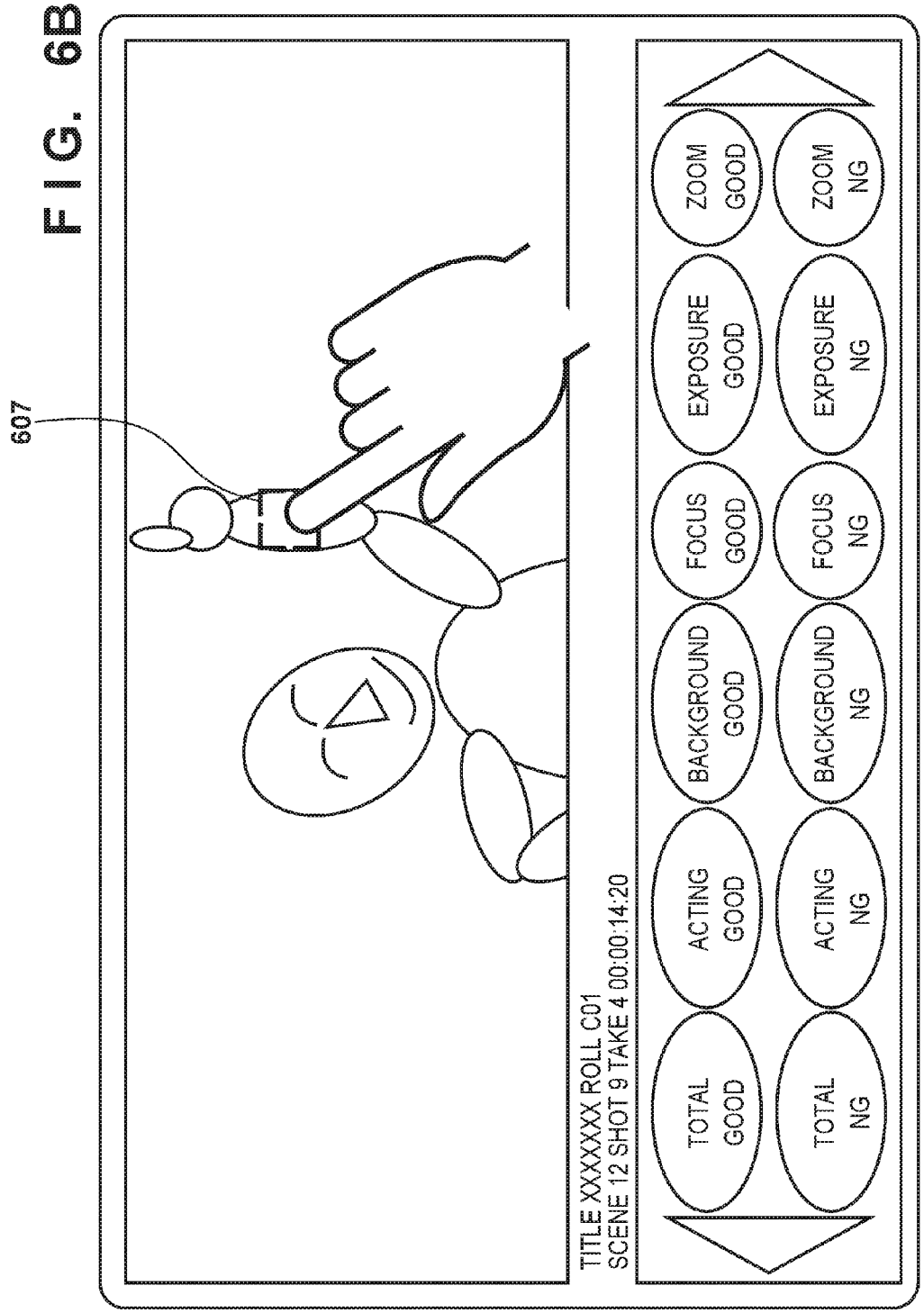

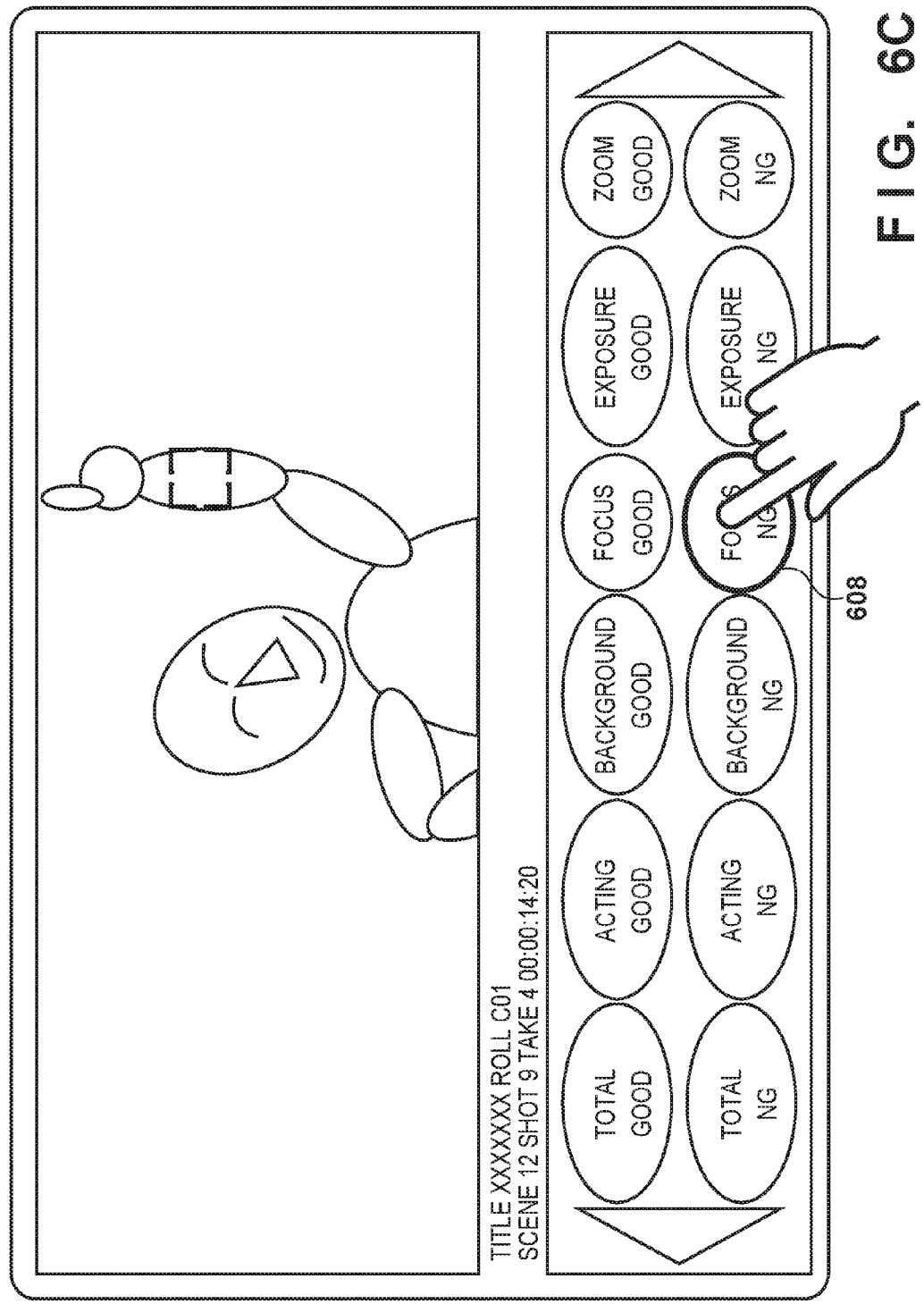

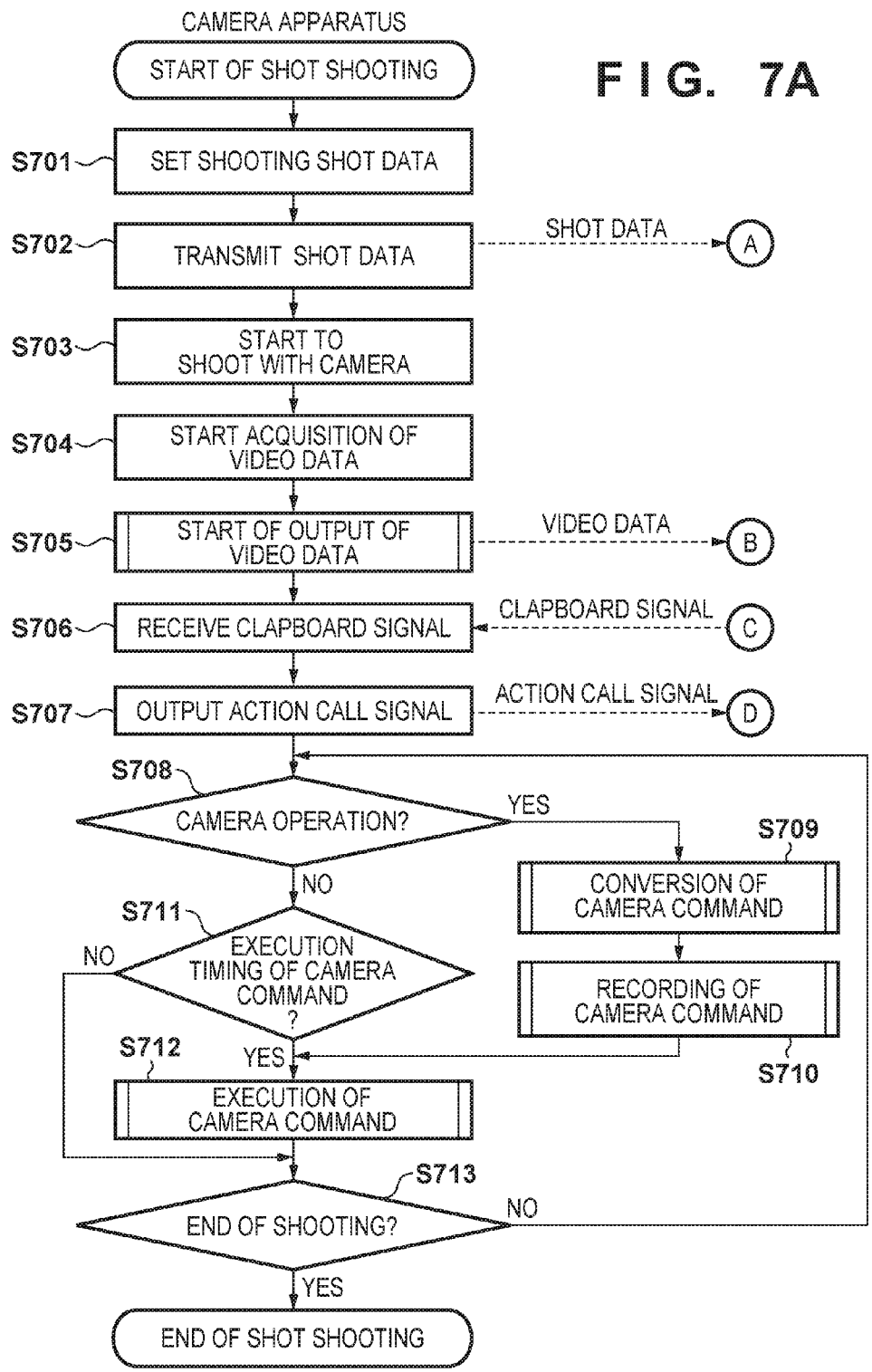

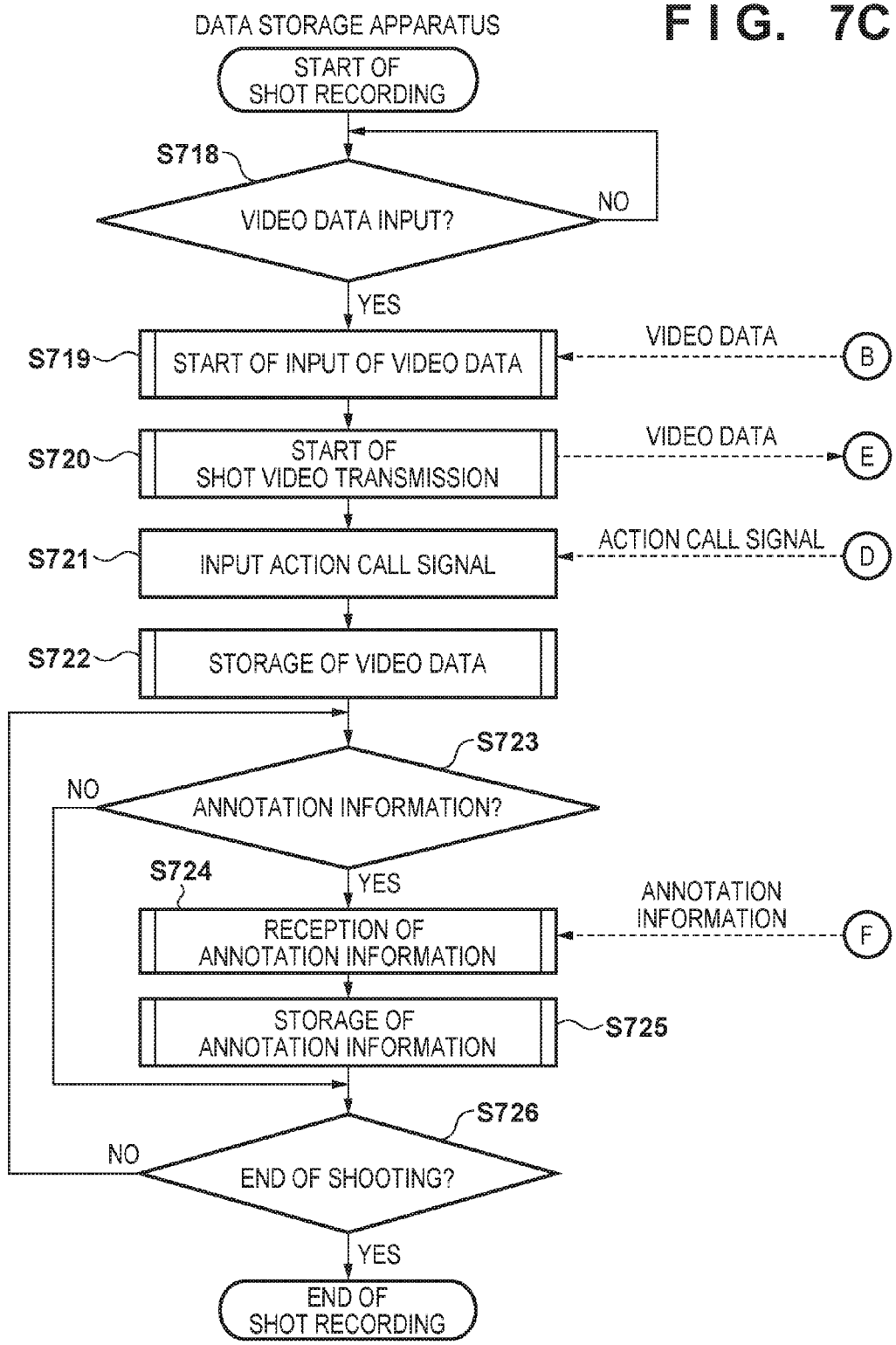

F I G. 9A

SHOT DATA

| SHOT ID | SEQUENCE NUMBER | SCENE NUMBER | SHOT NUMBER | TAKE NUMBER |
|---|---|---|---|---|
| RC01-S12-S09-T4 | RC01 | S12 | S09 | T4 |
| RC01-S12-S10-T1 | RC01 | S12 | S10 | T1 |
| RC01-S12-S10-T2 | RC01 | S12 | S10 | T2 |
| RC01-S12-S10-T3 | RC01 | S12 | S10 | T3 |
| RC01-S13-S01-T4 | RC01 | S13 | S01 | T1 |

FIG. 9B

ANNOTATION INFORMATION

| SHOT ID (901) | ANNOTATION ID (906) | TIME POSITION (907) | COORDINATE POSITION (908) | LARGE CLASSIFICATION (909) | SMALL CLASSIFICATION (910) | TAG (911) | COMMENT |
|---|---|---|---|---|---|---|---|
| RC01-S12-S09-T4 | 0016 | 00:00:11:10 | (800, 300) | ACTOR | ACTING | GOOD | |
| RC01-S12-S09-T4 | 0017 | 00:00:45:20 | (400, 300) | CAMERAWORK | FOCUS | NG | 913 |
| RC01-S12-S09-T4 | 0018 | 00:01:30:15 | (200, 500) | BACKGROUND | REFLECTION | NG | |
| RC01-S12-S09-T4 | 0019 | 00:02:45:20 | — | TOTAL | — | GOOD | |
| RC01-S12-S10-T1 | 0019 | 00:00:45:20 | (400, 300) | CAMERAWORK | FOCUS | GOOD | |
| RC01-S12-S10-T2 | 0020 | 00:00:45:20 | (400, 300) | CAMERAWORK | FOCUS | NG | |
| RC01-S12-S10-T3 | 0021 | 00:00:45:20 | (500, 200) | CAMERAWORK | EXPOSURE | GOOD | |
| RC01-S13-S01-T1 | 0022 | 00:00:45:20 | (400, 300) | CAMERAWORK | FOCUS | NG | |

912

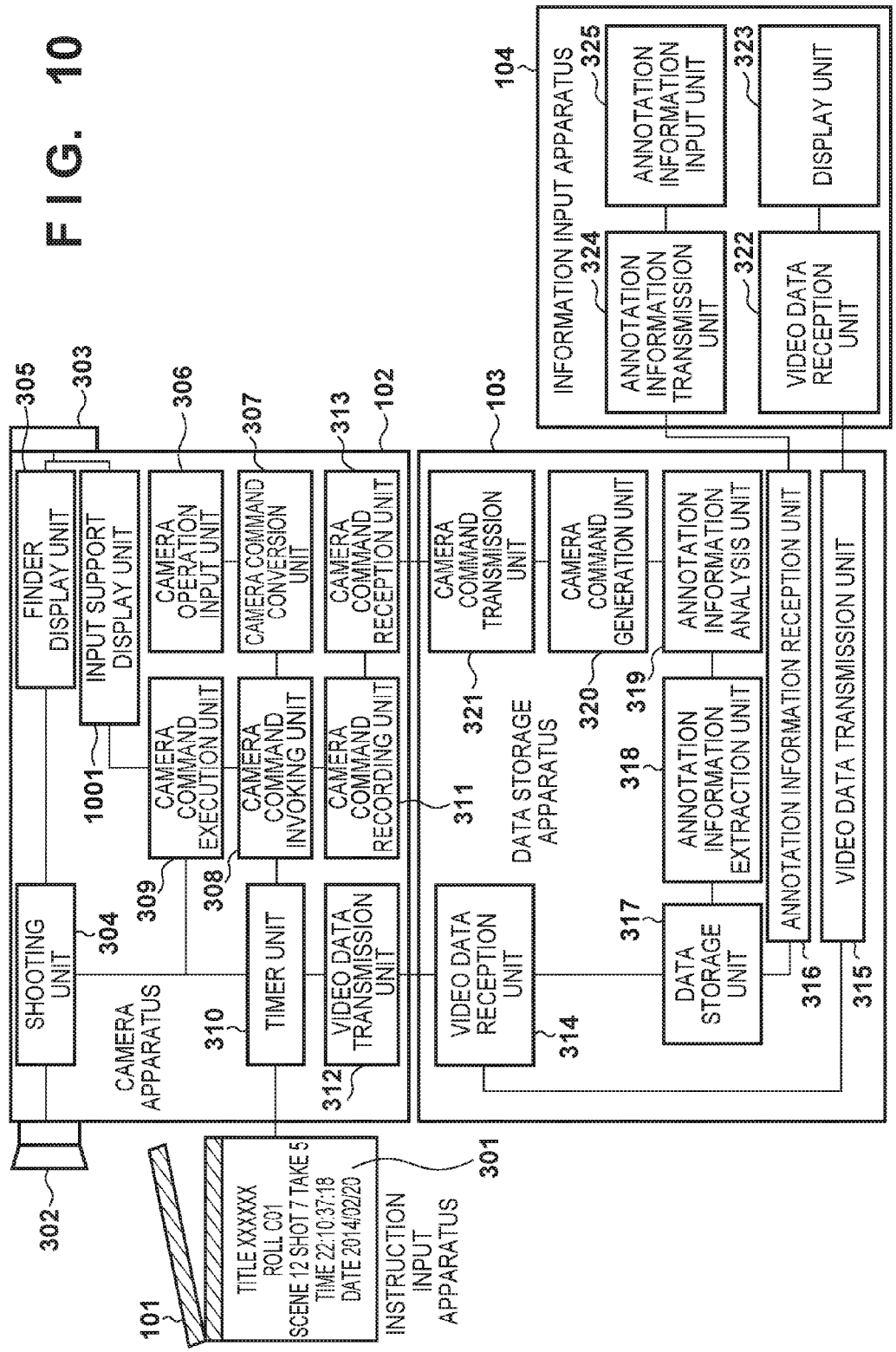

FIG. 13

| SHOT ID (901) | ANNOTATION ID (906) | TIME POSITION (907) | COORDINATE POSITION (908) | LARGE CLASSIFICATION (909) | SMALL CLASSIFICATION (910) | TAG (911) | COMMENT |
|---|---|---|---|---|---|---|---|
| RC01-S12-S09-T1 | 0016 | 00:00:11:10 | (800, 300) | ACTOR | ACTING | GOOD | |
| RC01-S12-S09-T1 | 0017 | 00:00:45:20 | (400, 300) | CAMERAWORK | FOCUS | NG | |
| RC01-S12-S09-T1 | 0018 | 00:01:30:15 | (200, 500) | BACKGROUND | REFLECTION | NG | |
| RC01-S12-S09-T1 | 0019 | 00:02:45:20 | — | TOTAL | — | GOOD | |
| RC01-S12-S09-T1 | 0020 | 00:00:11:10 | (800, 300) | ACTOR | ACTING | GOOD | |
| RC01-S12-S09-T1 | 0021 | 00:00:45:20 | — | CAMERAWORK | FOCUS | NG | |
| RC01-S12-S09-T1 | 0022 | 00:01:30:15 | (500, 200) | CAMERAWORK | APERTURE | GOOD | |

| SHOT ID 901 | ANNOTATION ID 906 | TIME POSITION 907 | COORDINATE POSITION 908 | LARGE CLASSIFICA-TION 909 | SMALL CLASSIFICA-TION 910 | TAG 911 | COMMENT |
|---|---|---|---|---|---|---|---|
| RC01-S12-S09-T1 | 0016 | 00:00:11:10 | (800, 300) | ACTOR | ACTING | GOOD | |
| RC01-S12-S09-T1 | 0017 | 00:00:45:20 | — | CAMERAWORK | FOCUS | GOOD | | 1801
| RC01-S12-S09-T1 | 0018 | 00:01:30:15 | (200, 500) | BACKGROUND | REFLECTION | NG | |
| RC01-S12-S09-T1 | 0019 | 00:02:45:20 | — | TOTAL | — | GOOD | |
| RC01-S12-S09-T2 | 0020 | 00:00:11:10 | (800, 300) | ACTOR | ACTING | GOOD | |
| RC01-S12-S09-T2 | 0021 | 00:00:45:20 | — | CAMERAWORK | FOCUS | NG | | 1802
| RC01-S12-S09-T2 | 0022 | 00:01:30:15 | (500, 200) | CAMERAWORK | APERTURE | GOOD | |

CONTROL APPARATUS, METHOD OF CONTROLLING SHOOTING APPARATUS, AND COMPUTER-READABLE STORAGE MEDIUM

BACKGROUND OF THE INVENTION

Field of the Invention

The present invention relates to a control apparatus, a method of controlling a shooting apparatus, and a computer-readable storage medium and, more particularly, to a technique of supporting shooting by using information added to video data obtained by shooting.

Description of the Related Art

Video content such as a digital cinema or drama is generally constituted by a plurality of scenes. Each scene is generally constituted by a plurality of shots, that is, short moving image data each being the minimum unit of shooting. In general, a shot is a moving image shot seamlessly and continuously. When shooting such a shot, it is often the case that shooting is repeated in similar situations, and the resultant replaceable shots are compared with each other to select a shot to be used finally. That is, in general, a plurality of shots (takes) as candidates are shot for each of the shots constituting a scene, and an optimal one of the shots is used for a work.

When shooting a plurality of similar situations in this manner, similar acting of actors and similar camerawork is repeated, and similar operations concerning a camera are repeated accordingly. In some cases, operations are changed in accordance with the influences of director's intentions and unpredictable natural phenomena. For this reason, camera operators have recorded camera control values and attention points at the time of past shooting in similar situations, and have manually performed camera operations based on the recorded information.

There is known a technique of supporting camera operations when repeatedly shooting similar situations in consideration of the above case. For example, Japanese Patent Laid-Open No. 2013-162178 discloses a shooting apparatus which displays shooting instruction information based on scenario data prepared in advance and rewrites the scenario data, when a shooting state at the time of shooting deviates from the scenario data, upon considering that a different shooting technique has been intentionally adopted. This makes it possible to support shooting in consideration of changes in shooting technique in the past.

SUMMARY OF THE INVENTION

The arrangement disclosed in Japanese Patent Laid-Open No. 2013-162178 is configured to change scenario data based on the deviations between scenario data prepared in advance and a shooting state at the time of actual shooting, but is not configured to automatically reflect attention points noticed by staff such as a director at the time of shooting in the next shooting.

The present invention has been made to solve the above problem and provides a technique of using information added to an image shot in the past by the user for the subsequent shooting.

According to one aspect of the present invention, a control apparatus includes: an acquisition unit adapted to acquire annotation information input by a user with respect to a first image shot by a shooting unit; a conversion unit adapted to convert the annotation information into a camera command defining an operation of the shooting unit; and an execution unit adapted to cause the shooting unit to execute an operation based on the camera command when shooting a second image shot after the first image.

According to another aspect of the present invention, a method of controlling a shooting apparatus which shoots an image by using a shooting unit, the method includes: acquiring annotation information input by a user with respect to a first image shot by the shooting apparatus; converting the annotation information into a camera command defining an operation of the shooting unit; and causing the shooting unit to execute an operation based on the camera command when shooting a second image shot after the first image.

Further features of the present invention will become apparent from the following description of exemplary embodiments (with reference to the attached drawings).

BRIEF DESCRIPTION OF THE DRAWINGS

FIG. 3 is a block diagram showing the internal arrangement of a shooting system;

FIG. 6A is a view for explaining a logging screen of annotation information;

FIG. 6B is a view for explaining the logging screen of the annotation information;

FIG. 6C is a view for explaining the logging screen of the annotation information;

FIG. 7A is a flowchart for explaining a logging operation for annotation information;

FIG. 7C is a flowchart for explaining a logging operation for annotation information;

FIGS. 9A and 9B are views for explaining data arrangements;

FIG. 10 is a block diagram showing the internal arrangement of a shooting system;

FIG. 13 is a view for explaining the arrangement of annotation information;

FIG. 18 is a view for explaining the arrangement of annotation information.

DESCRIPTION OF THE EMBODIMENTS

The embodiments of the present invention will be described in detail below with reference to the accompanying drawings. Note that the arrangement described in each embodiment is merely an example, and the present invention is not limited to the arrangements shown in the accompanying drawings.

(Arrangement of Shooting System)

Figure 1:
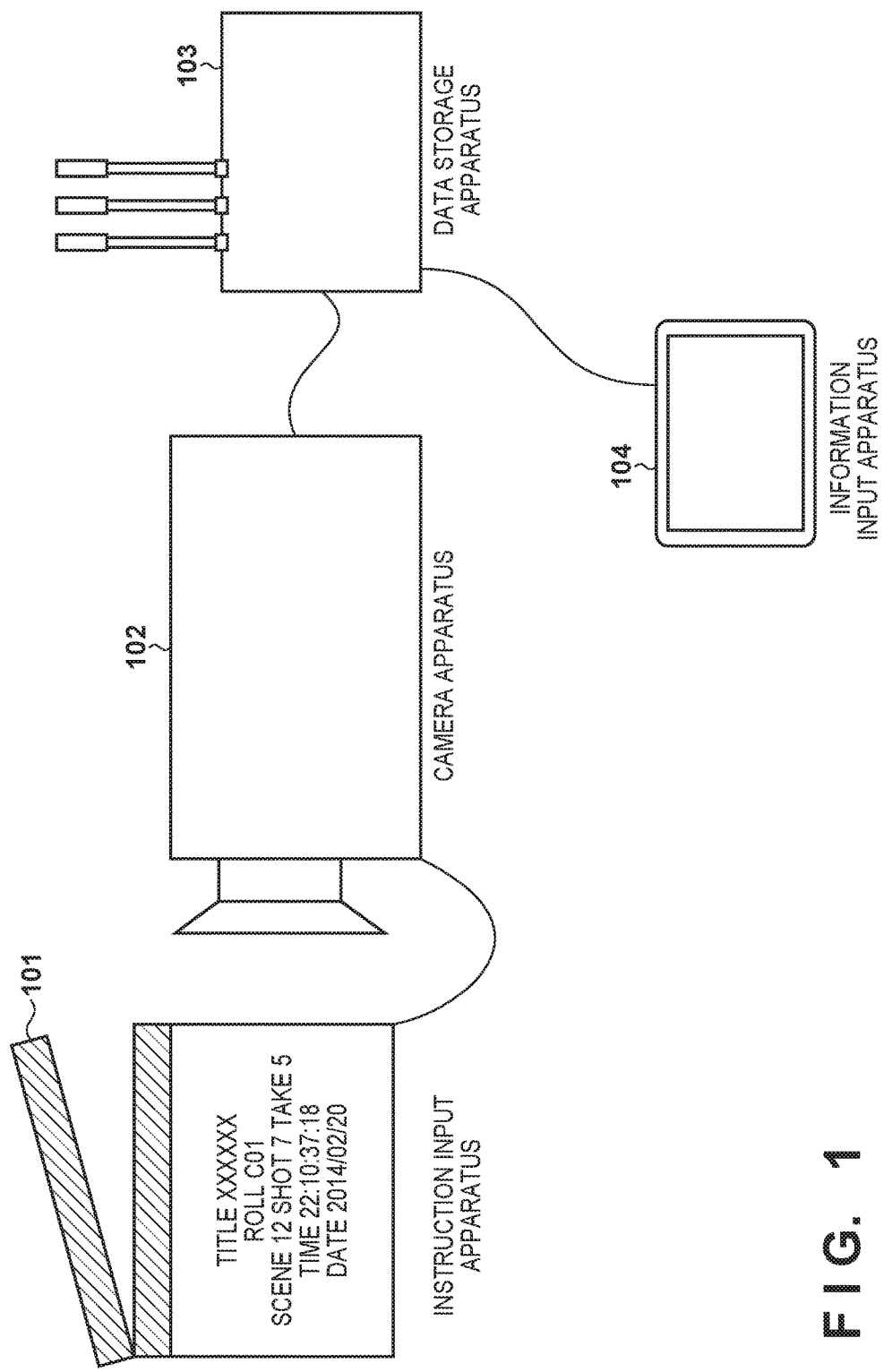
FIG. 1 is a view showing the arrangement of an overall shooting system.

FIG. 1 is a view showing the arrangement of an overall shooting system according to an embodiment of the present invention. This system includes an instruction input apparatus 101. As will be described later, in response to an operation on the instruction input apparatus 101, the system starts to store (record) video data. In addition, operations on the instruction input apparatus 101 will designate the start and end of a shot (to be described later). The instruction input apparatus 101 also has a function of attaching a visual tag to the shot. The instruction input apparatus 101 is a digital clapboard which has, for example, the shape of a clapboard and can output a signal to the outside in accordance with an operation input to the instruction input apparatus 101.

A camera apparatus 102 is used for shooting. Note that this system may include a plurality of camera apparatuses. Although this embodiment will exemplify a case in which a video as a moving image is shot, the arrangement according to the embodiment can be applied to a case in which a still image is shot.

A data storage apparatus 103 has not only a function of storing video data for each shot obtained by shooting and meta data associated with the video data but also a function of communicating with the camera apparatus 102 and an information input apparatus 104 (to be described later).

The information input apparatus 104 includes an operation input unit which displays a shot video and inputs, as meta data, information (annotation information) added to the video by a user such as a director. Although this embodiment will exemplify, as the operation input unit, a touch panel which detects the touch operation of the user. However, an input operation may be performed by using a mouse or keyboard. Note that information added to a shot image by the user will be referred to as annotation information, and is information in an arbitrary format. In addition, information formed from character strings will be described as annotation information, but this is not exhaustive.

In addition, the information input apparatus 104 displays video data stored in the data storage apparatus 103. Although this embodiment will exemplify a case in which a user who operates the camera apparatus 102 is different from a user who operates the information input apparatus 104, the same person may operate them. The information input apparatus 104 can be implemented by, for example, a tablet terminal or PC (Personal Computer).

(Video Data)

Figure 2A:
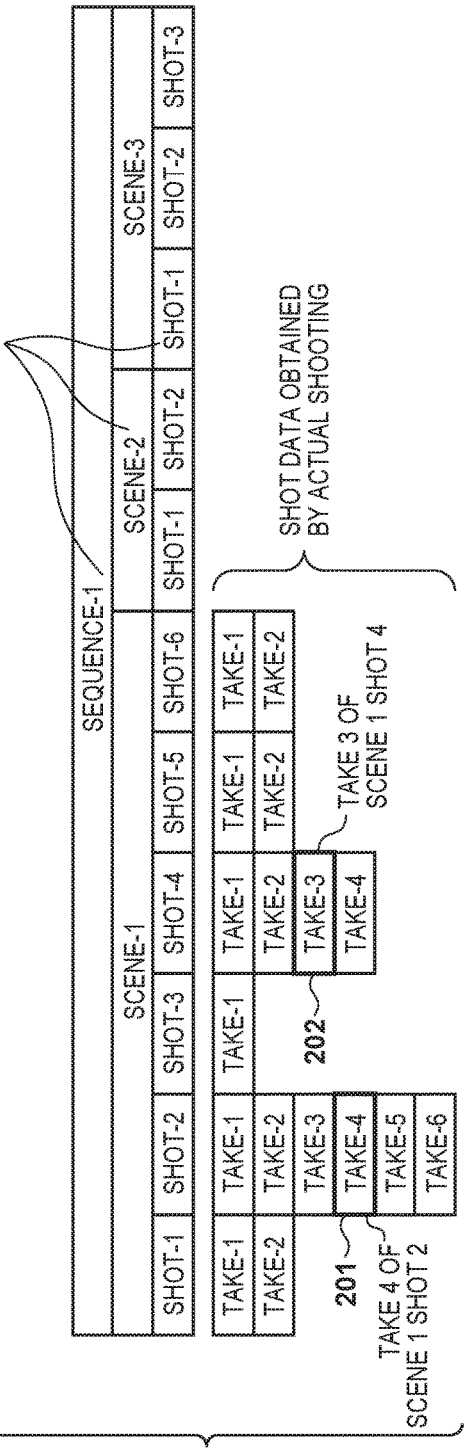
FIGS. 2A and 2B are views for explaining the relationship between scenes and shots.

FIG. 2A is a view for hierarchically explaining video data constituting video content such as a digital cinema or drama. Video content based on a script or scenario is generally constituted by one or more sequence videos. One sequence video is constituted by a plurality of various scenes.

Each scene is generally constituted by a plurality of shots, each being the unit of shooting. A shot is generally a seamlessly and continuously shot video. For example, in a scene in which two persons A and B make a conversion with each other, a variety of shots are taken, including a long shot of the two persons making a conversation with each other, a closeup shot of person B, and a shoulder shot of person A shot over the shoulder of person B. For this reason, shots and scenes are not always taken in the order of a script or scenario (the order in video content), and are often taken in an order different from the order of the scenario according to the conveniences of a camera and a set. In addition, one shot is video data obtained by shooting for a relatively short period of time (several sec to several tens of secs).

In addition, one shot is sometimes repeatedly retaken because of the influences of mistakes by actors and staff, director's intentions, unpredictable natural phenomena, and the like. These operations are called takes. That is, when shooting specific video content, adding serial numbers to sequences, scenes, shots, and takes can specify the video data of each shot. For example, referring to FIG. 2A, take 4 (201) is the fourth take of sequence 1 scene 1 shot 2, and take 3 (202) is the third take of sequence 1 scene 1 shot 4. If there are a plurality of takes having the same shot number, the shooting system recognizes them as replaceable takes. If there are a plurality of takes, one of them is selected as a shot to be finally included in video content. When shooting a digital cinema, drama, or the like, these pieces of information are added as meta data for each file in each shot shooting operation. In addition, the pieces of information are displayed on a clapboard according to convention, and are often shot at the start of a shot. Obviously, the terms "sequence", "scene", "shot", "take", and the like are merely examples for explaining this embodiment, and different terms are sometimes used in the actual video production industry. In addition, each embodiment can be applied to various types of images in addition to the above sequences, scenes, shots, and takes. For example, each embodiment can be applied to a technique of supporting shooting of a plurality of image data to be shot with the same settings.

Figure 2B:
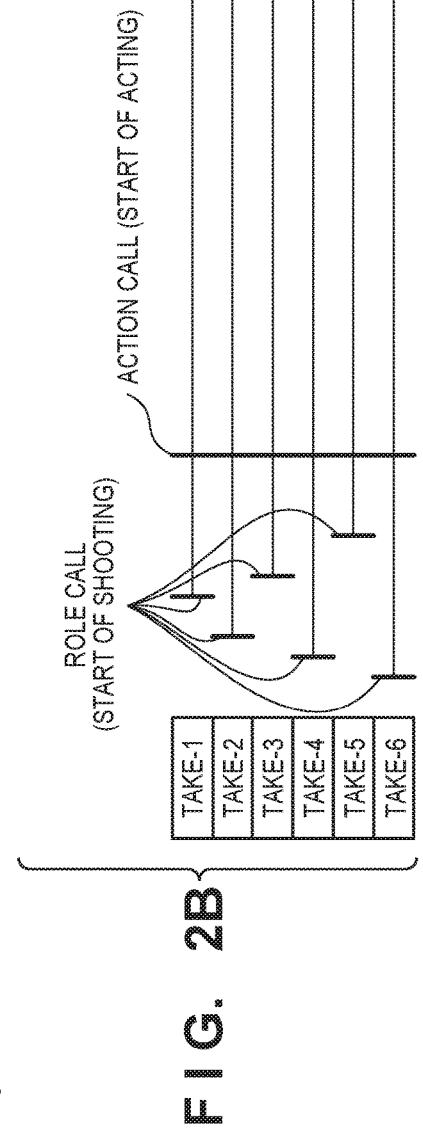

FIG. 2B is a view for explaining the coincidence of the time axes of a plurality of takes of the same shot. Takes are essentially retakes of a shot, and hence the lengths of the shooting times of them are almost the same and are replaceable when one of them is finally set (adopted) in video content. In actual shooting, however, the time interval from the start of shooting with the camera to the start of acting sometimes varies. The same applies to the shooting of takes. Note that in the following description, the terms "shot" and "take" will be treated as synonymous. For example, the time interval from the moment the user starts to check a video in the finder of the camera to the moment the user checks settings concerning the illumination, camera, and lens often varies. In such a situation, when, for example, a director inputs an operation to the instruction input apparatus 101 as a command for the start of acting, it is possible to designate the start time of each of a plurality of takes by regarding the input timing as an action call corresponding to the start time of the take. It is possible to designate the end times of takes in the same manner.

FIG. 2B shows the shooting timings of the respective takes of a shot. Referring to FIG. 2B, although the time interval from a role call (a shooting start instruction) as the start of shooting to an action call as an acting start instruction varies among takes 1 to 6, actors and staff start to act in response to the action call. This makes it possible to roughly synchronize time among the takes. In addition, this action call makes it possible to output a signal for synchronizing the takes of the same shot to the connected camera via the instruction input apparatus 101.

(Functional Arrangement)

FIG. 3 is a view for explaining the functional block arrangement of the overall shooting system according to this embodiment. As shown in FIG. 3, the shooting system according to the embodiment includes the instruction input apparatus 101, the camera apparatus 102, the data storage apparatus 103, and the information input apparatus 104.

Instruction Input Apparatus 101

The instruction input apparatus 101 is connected to the camera apparatus 102. Although this embodiment will exemplify a case in which the instruction input apparatus 101 is connected to the camera apparatus 102 via a wire cable, they may communicate signals and information with each other via a wireless communication scheme such as a wireless LAN or Bluetooth®. The instruction input apparatus 101 displays, on a display device 301, shooting information sent from the camera apparatus 102, and transmits, to the camera apparatus 102, timing information indicating the timing of an action call operation with respect to the instruction input apparatus 101.

Camera Apparatus 102

The camera apparatus 102 includes functional blocks 302 to 313. The functional block 302 is a lens apparatus for shooting. The functional block 303 is a screen (finder screen) for checking a shot image. The functional block 304 is a shooting unit for shooting a video. The functional block 305 is a finder display unit which displays a shot image on the finder screen 303.

The functional block 306 is a camera operation input unit (to be referred to as an "operation input unit" hereinafter), which corresponds to switches with which the camera operator performs a camera operation. The functional block 307 is a camera command conversion unit (to be referred to as a "conversion unit" hereinafter), which converts a camera operation input with the operation input unit 306 into a camera command. A camera command is information which defines an operation such as the camerawork of the camera apparatus 102. A camera command is, for example, information indicating a zoom magnification or information indicating a focus position. Letting the camera apparatus 102 read camera commands can automatically make settings concerning shooting. Assume that camerawork includes the pan movement, tilt movement, focus position, exposure, and zoom of the camera.

The functional block 308 is a camera command invoking unit (to be referred to as a "invoking unit" hereinafter), which invokes a camera command converted by the conversion unit 307. The functional block 309 is a camera command execution unit (to be referred to as an "execution unit" hereinafter), which causes the shooting unit 304 to execute a camera command invoked by the invoking unit 308. The functional block 310 is a timer unit (shooting time timer unit), which measures the time since the timing of an action call received from the instruction input apparatus. The functional block 311 is a camera command recording unit (to be referred to as a "recording unit" hereinafter), which records a camera command. The recording unit 311 records a camera command invoked by the invoking unit 308 in association with a time position measured by the timer unit 310.

The functional block 312 is a video data transmission unit, which transmits video data during shooting and meta data created upon shooting. The functional block 313 is a camera command reception unit, which receives a camera command from the outside. Although this embodiment will exemplify a case in which the camera apparatus 102 and the data storage apparatus 103 communicate with each other by wireless communication, they may communicate with each other via a wire cable.

Data Storage Apparatus 103

The data storage apparatus 103 includes functional blocks 314 to 321. The functional block 314 is a video data reception unit, which receives video data output from the camera apparatus 102. The functional block 315 is a video data transmission unit, which transmits received video data to the information input apparatus 104. The functional block 316 is an annotation information reception unit, which receives annotation information output from the information input apparatus 104. The functional block 317 is a data storage unit, which associates video data received from the camera apparatus 102 by the video data reception unit 314 with annotation information received from the information input apparatus 104 by the annotation information reception unit 316, and stores the resultant data as shot data.

In addition, the functional block 318 is an annotation information extraction unit, which extracts annotation information corresponding to an associated shot from shot data stored in the data storage unit 317. The annotation information extraction unit 318 extracts annotation information having a predetermined association with a shot received by the video data reception unit 314. For example, the annotation information extraction unit 318 extracts other takes belonging to the same shot, takes belonging to preceding and succeeding shots, and the like as associated shots.

The functional block 319 is an annotation information analysis unit, which analyzes annotation information extracted by the annotation information extraction unit 318. The functional block 320 is a camera command generation unit (to be referred to as a "generation unit" hereinafter), which generates a camera command based on annotation information analyzed by the annotation information analysis unit 319. The functional block 321 is a camera command transmission unit, which transmits a camera command to the camera apparatus 102. The camera command reception unit 313 receives a camera command generated by the generation unit 320 and transmitted by the camera command transmission unit 321. The recording unit 311 records this command. Although this embodiment will exemplify a case in which the data storage apparatus 103 and the information input apparatus 104 communicate with each other by wireless communication, they may communicate with each other via a wire cable.

Information Input Apparatus 104

The information input apparatus 104 includes functional blocks 322 to 325. The functional block 322 is a video data reception unit, which receives video data transmitted from the data storage apparatus 103. The display unit 323 displays a video based on received video data, annotation information added to the video by processing by the information input apparatus 104, and the like. The display unit 323 is implemented by a display device such as a liquid crystal panel or organic EL display. The display unit 323 of the information input apparatus 104 displays video data received by the video data reception unit 322 as needed. The functional block 325 is an annotation information input unit, which inputs an annotation at a specific time position of video data by a touch operation on the screen. As will be described later, annotation information is an instruction added to a shot video by the user and includes shooting conditions and a comment (text information) concerning an image. The functional block 324 is an annotation information transmission unit, which transmits annotation information input by the annotation information input unit 325 to the data storage apparatus 103.

In this embodiment, the information input apparatus 104 displays video data during shooting in real time to allow an annotation to be added to the video data. In order to implement this, it is possible to use, for example, a technique of generating a proxy video with a low resolution concerning shot video data in real time and displaying the proxy video on the information input apparatus 104. Since an arbitrary technique can be used for video transfer processing itself, a detailed description of the technique will be omitted.

(Hardware Arrangement)

Figure 4:
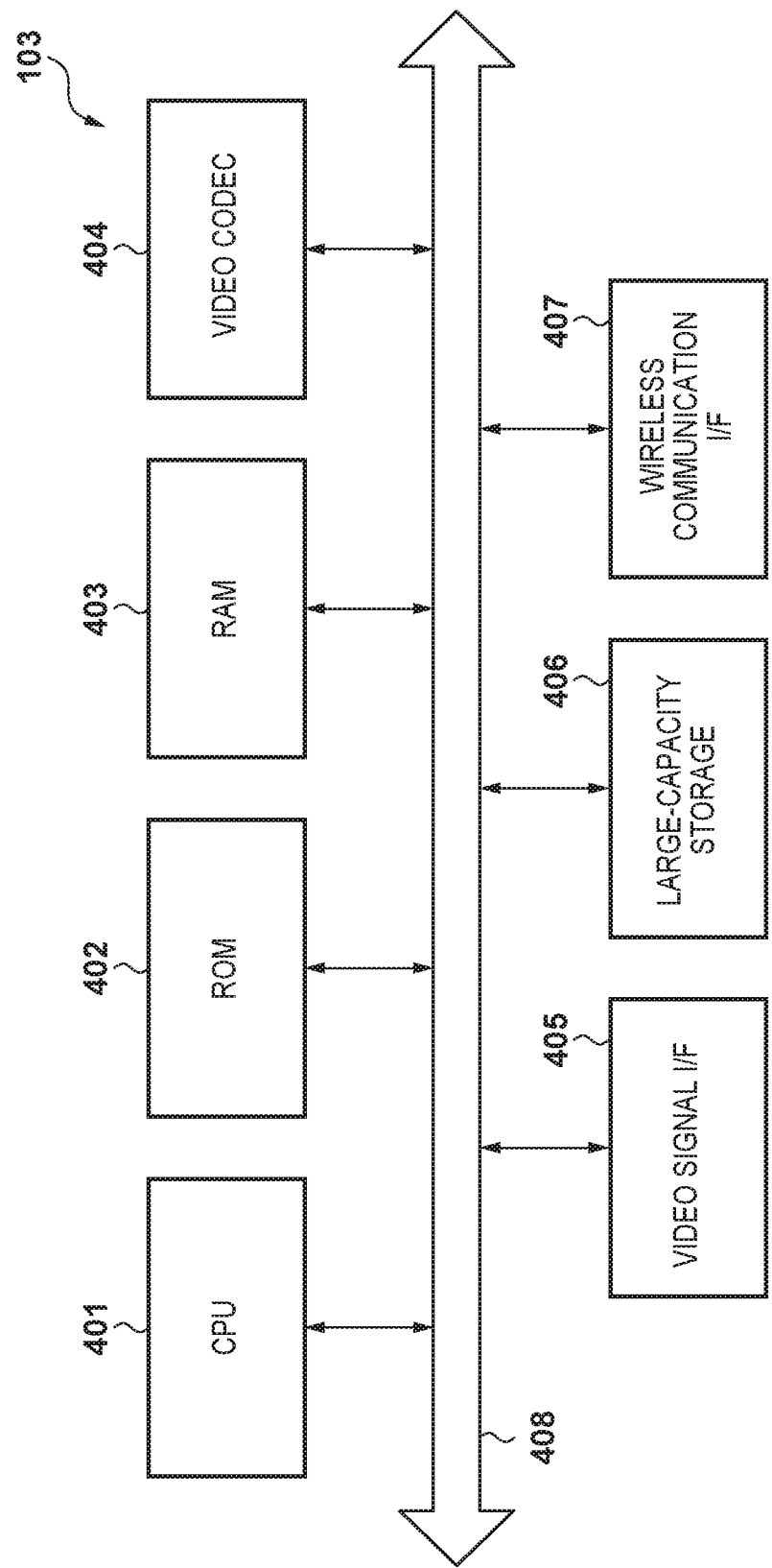
FIG. 4 is a block diagram showing the internal arrangement of a data storage apparatus.
Figure 5:
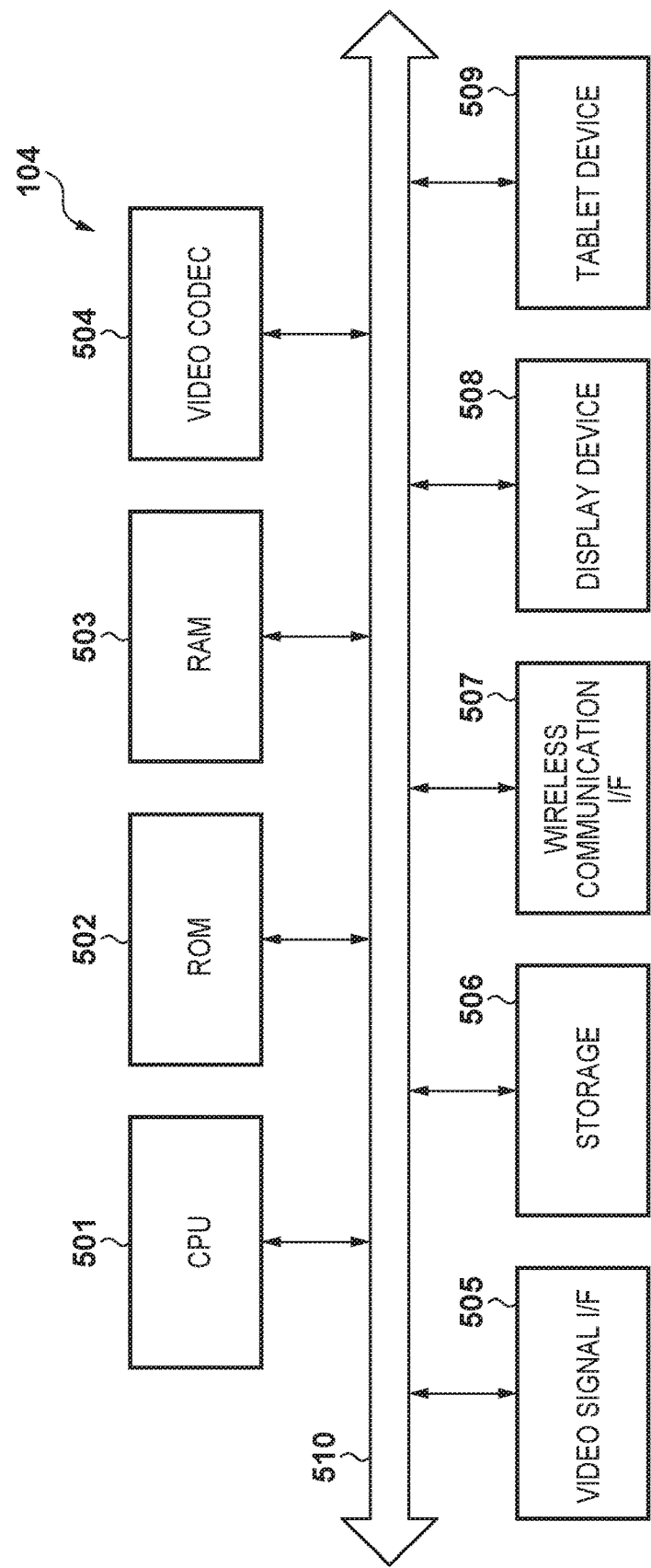
FIG. 5 is a block diagram showing the internal arrangement of an information input apparatus.

The internal hardware arrangements of the data storage apparatus 103 and the information input apparatus 104 according to this embodiment will be described next with reference to FIGS. 4 and 5. FIG. 4 is a block diagram showing the hardware arrangement of the data storage apparatus 103. FIG. 5 is a block diagram for explaining the hardware arrangement of the information input apparatus 104. In this case, functional blocks 401 to 407 have the same functions as those of functional blocks 501 to 507 although they can differ in their sizes, and the same applies to functional blocks 408 and 510. For this reason, the following descriptions are common to these constituent elements.

The functional blocks 401 and 501 are CPUs (Central Processing Units), which perform arithmetic operations, logical determination, and the like for various types of processing and control the respective constituent elements connected to the buses 408 and 510. The data storage apparatus 103 or the information input apparatus 104 incorporates memories including a program memory and a data memory. The program memory stores computer programs for control by the CPU, including processing procedures to be described with reference to flowcharts. The memories may be the ROMs (Read Only Memories) 402 and 502 or the RAMS (Random Access Memories) 403 and 503 in which computer programs from an external storage device and the like are loaded.

The functional blocks 404 and 504 are video CODECs, which are dedicated to perform various types of transcode processing for video signals which require long times when being processed by the CPUs 401 and 501 described above. The video CODECs 404 and 504 are formed from media processors for graphic processing and the like. The functional blocks 405 and 505 are video signal I/Fs, which are high-speed I/Fs which process video stream signals. The functional blocks 406 and 506 are storages, which are devices for storing or caching video signals at high speed. The functional blocks 407 and 507 are wireless communication I/Fs for transmitting/receiving video streams, which hold wide band widths and a plurality of channels.

The functional block 508 is a display device, which displays processing results obtained by the information input apparatus 104 and the like to the operator. The functional block 509 is a tablet input device, which detects an instruction from the operator with a contact sensor and inputs the instruction. The display device 508 and the tablet input device 509 function as devices constituting a UI of the information input apparatus to provide a direct UI which allows the operator to easily operate by touching a display screen.

(Outline of Operation)

FIGS. 6A, 6B, and 6C are views showing examples of the display screen and operation screen of the information input apparatus 104 according to this embodiment. The following description will be made with reference to these drawings, concerning an operation of a director or staff who adds annotation information in real time when shooting a shot with the camera apparatus 102. Referring to FIG. 6A, the information input apparatus has a display screen 601 and a screen 602 on which an image during shooting is displayed in real time by using a shot video. By touching this screen, the operator can add annotation information corresponding to the touched place. Displayed data 603 is shot data during shooting. Short cut buttons 604 are used to designate the types of annotation information. Move buttons 605 and 606 are used to display short cut buttons which are not displayed on the screen. The details of FIGS. 6A, 6B, and 6C will be described in a detailed operation description using FIGS. 7A, 7B, 7C, and 7D.

FIGS. 7A, 7B, 7C, and 7D are flowcharts showing processing procedures respectively executed by the camera apparatus 102, the instruction input apparatus 101, the data storage apparatus 103, and the information input apparatus 104 when shooting a shot. FIG. 8 is a flowchart for explaining processing executed by the data storage apparatus 103 when converting annotation information into a camera command.

FIG. 9A is a view showing the arrangement of shot data according to this embodiment. Shot data is information which specifies the position of the corresponding shot in the layer structure exemplarily shown in FIG. 2A. Shot data includes information such as a unique shot ID (ID: Identification Information) 901, a sequence number 902, a scene number 903, a shot number 904, and a take number 905. FIG. 9B is a view showing the arrangement of annotation information according to the embodiment. First of all, the annotation information includes a shot ID 901 synonymous with the above term, which is used to identify a shot to which an annotation is added. In addition, this information includes an annotation ID 906 for identifying an annotation in the same shot, a time position 907 at which the annotation is added with reference to an action call (the timing of 0 sec), and a coordinate position 908 on the screen at which the annotation is added. The information further includes information such as a large classification 909, a small classification 910, and a tag 911. Note that these pieces of information are merely examples, and the data items, classification method, structure, and the like to be used are not limited to them.

This embodiment is configured to acquire annotation information added by the user to an image (first image) shot in advance and convert the annotation information into a camera command defining the operation of the camera apparatus 102. When shooting a new image (second image) using the camera apparatus 102, this camera command is executed. Since pieces of annotation information reflecting user's attention points concerning an image shot in advance are converted into camera commands to be reflected in the operation of the camera apparatus 102 in this manner, it is possible to automatically reflect attention points noticed during repeated shooting in camera operations.

(Shooting Processing)

Processing procedures executed by the shooting system according to this embodiment will be described in detail with reference to FIG. 1 to FIGS. 9A and 9B. In general, when shooting a cinema or drama, the order of shots to be shot is determined based on a shooting plan made in advance based on a set in a shooting studio, the schedules of actors, and the like. Although the order of shots does not always coincide with the sequence of a script or scenario, a unique shot ID like the ID 901 is added to each shot and set in the camera apparatus 102 in advance.

Operation of Camera Apparatus 102

FIG. 7A is a flowchart for explaining processing executed when the camera apparatus 102 shoots a specific shot. Each step described below is executed under the control of the CPU (not shown) of the camera apparatus 102.

First of all, in step S701, shot data like that shown in FIG. 9A is set in the camera based on the shot ID 901. In step S702, the CPU transmits the shot data set in step S701 to the wire-connected instruction input apparatus 101. In step S703, the shooting unit 304 starts to shoot. In step S704, the CPU sequentially acquires video data, for example, information such as shot data, video data, shooting settings, and time codes. In step S705, the video data transmission unit 312 starts to output the video data acquired in step S704 to the data storage apparatus 103.

Subsequently, as soon as a signal is received from the instruction input apparatus 101 in step S706, the video data transmission unit 312 transmits an action call signal as meta data of reference time position information for matching time axes to the data storage apparatus 103 in step S707. An action call signal is a signal indicating the start of a shot or take. In the above case, an action call signal is transmitted in response to the reception of a signal from the instruction input apparatus. However, this is not exhaustive. For example, an action call signal may be transmitted at a timing recognized by using a technique of speech recognition of an action call uttered by a director, a technique of recognizing a switching operation or gesture with respect to the shooting system, or the like. As will be described later, the data storage apparatus 103 starts to store video data in accordance with the reception of an action call signal.

Subsequently, the invoking unit 308 executes steps S708 to S711. First of all, if the CPU determines in step S708 that there is an input from the operation input unit 306 (YES in step S708), the conversion unit 307 converts the operation input to a camera command in step S709. In step S710, the recording unit 311 records the camera command together with a time position with reference to the action call. In step S712, the CPU executes the command. When the execution is complete in step S712, the process advances to step S713.

If the CPU determines in step S708 that there is no camera operation input (NO in step S708), the process advances to step S711. The CPU determines in step S711 whether any camera command recorded on the recording unit 311 coincides in time position with reference to the action call. If there is any such command (YES in step S711), the camera command is invoked and executed in step S712. When the processing in step S712 is complete, the process advances to step S713. In contrast, if the CPU determines in step S711 that there is no such command (NO in step S711), the process advances to step S713.

Subsequently, a shot is continuously shot until the end of shooting in step S713. Note that the camera command may be a procedure for invoking units each obtained by recording the sequence number 902, the scene number 903, the shot number 904, and a combination of them based on the shot data shown in FIG. 9A. In addition, the order of step S708 of determination of a camera operation input and step S711 of determination of a recorded camera command is not limited to this, and may be selectively changed.

Operation of Instruction Input Apparatus 101

Figure 7B:
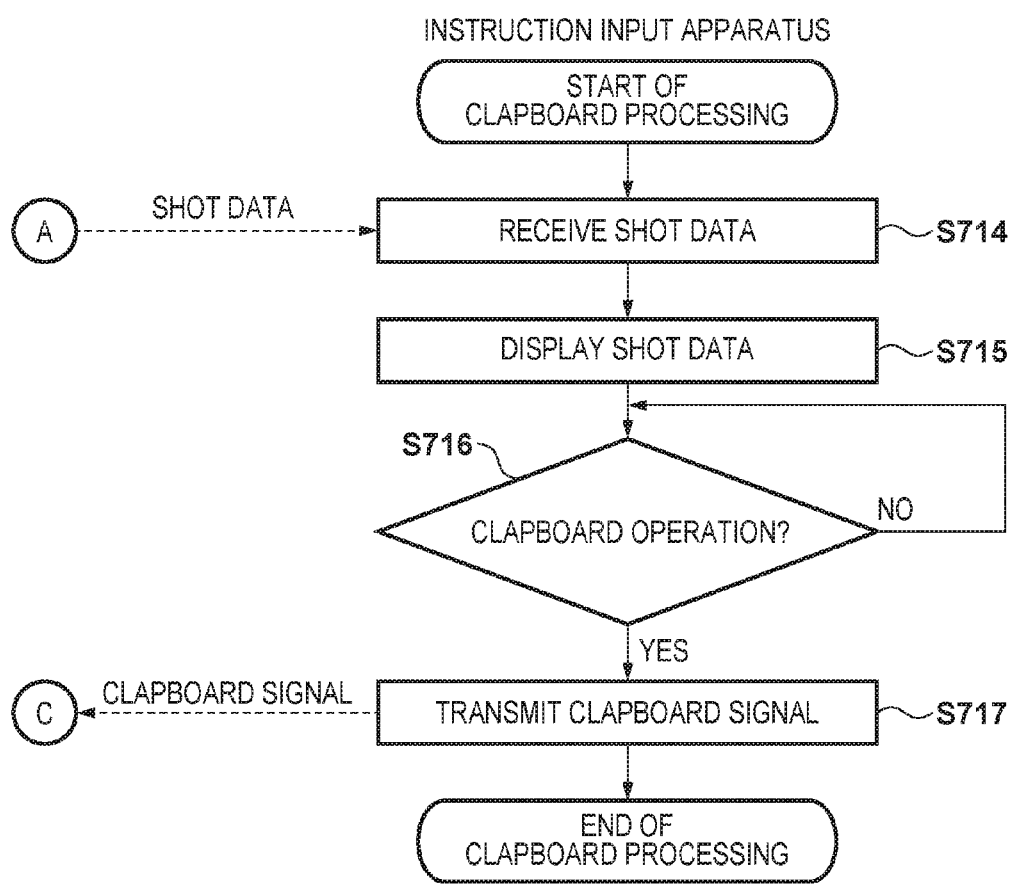
FIG. 7B is a flowchart for explaining a logging operation for annotation information.
Figure 8:
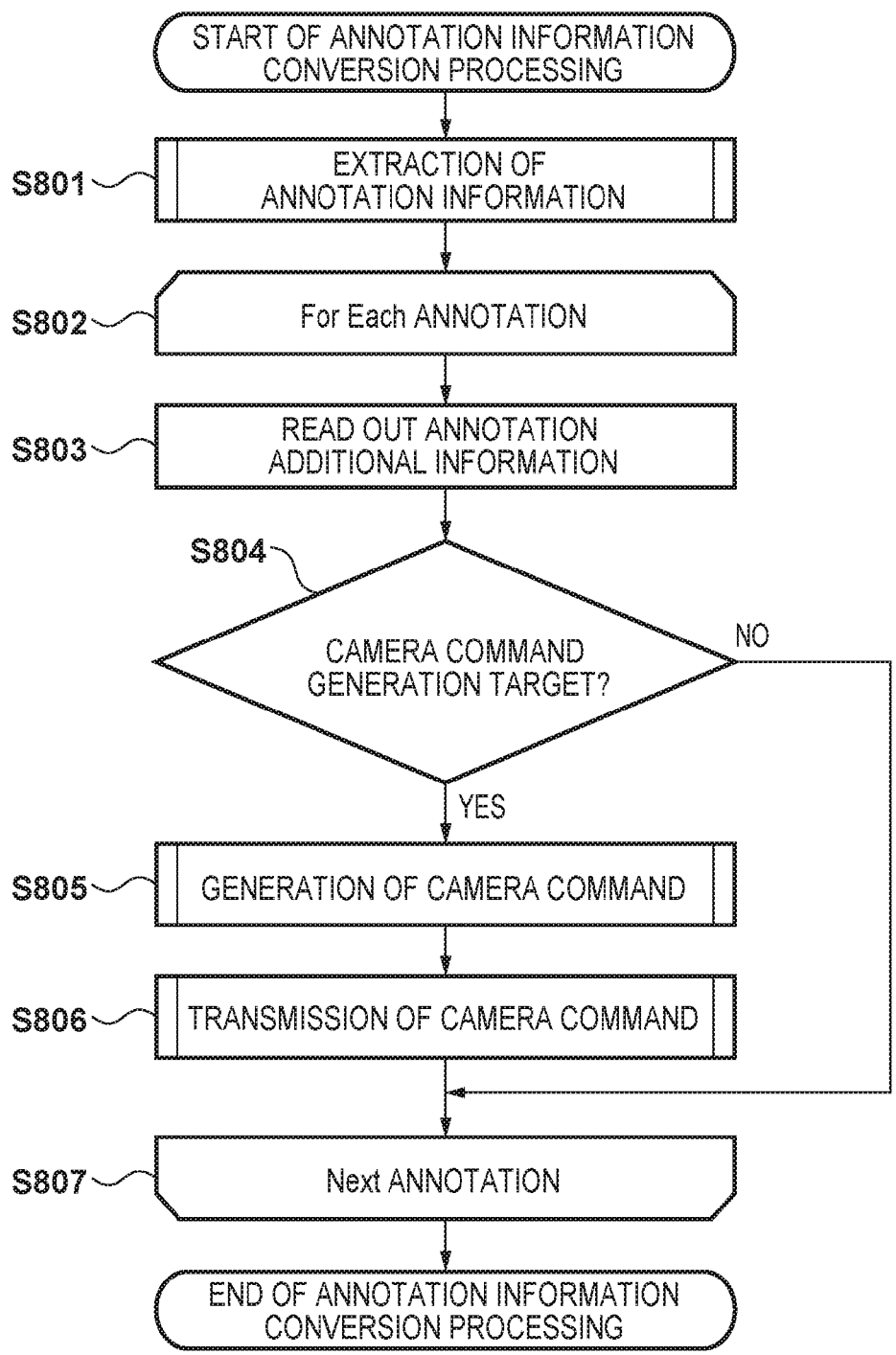
FIG. 8 is a flowchart for explaining a camera command converting operation for annotation information.

FIG. 7B is a flowchart for explaining processing to be executed by the instruction input apparatus 101 connected to the camera apparatus 102 when shooting a shot. Each step described below is executed under the control of the CPU (not shown) of the instruction input apparatus 101. In step S714, upon receiving shot data from the camera apparatus 102, the CPU displays the shot data in step S715. After the start of shooting, the CPU determines in step S716 whether the clapboard is operated. If the clapboard is operated (YES in step S716), the process advances to step S717 to transmit a clapboard signal to the camera apparatus 102. The processing is then terminated. As described above, the CPU transmits a clapboard signal to the camera apparatus 102 in accordance with the operation of the instruction input apparatus 101. In response to this, the camera apparatus 102 transmits an action call signal to the data storage apparatus 103, thereby starting to store video data. That is, the operation of the instruction input apparatus 101 is a trigger for the start of storage of video data.

Operation of Data Storage Apparatus 103

FIG. 7C is a flowchart for explaining processing to be executed by the data storage apparatus 103 when shooting a shot. Each step described below is executed under the control of the CPU 401 of the data storage apparatus 103. The CPU 401 waits for the start of the input of video data from the camera apparatus 102 in step S718. When the input of video data starts (YES in step S718), the CPU 401 starts to input video data in step S719.

In step S720, the CPU 401 extracts video data from the video data input in step S719, and starts to transmit the data to the information input apparatus 104. In step S721, the CPU 401 inputs an action call signal from the camera apparatus 102. The CPU 401 sequentially stores the video data input in steps S719 and S720 and meta data including the action call in the data storage unit 317 in step S722.

Subsequently, while the video data is input and stored in step S722, the CPU 401 determines in step S723 whether annotation information is input from the information input apparatus 104. If annotation information is input (YES in step S723), the CPU 401 receives the annotation information in step S724. In step S725, the CPU 401 stores the annotation information received in step S724 in the data storage unit 317 in association with shot data during shooting. The process then advances to step S726. In step S726, the CPU 401 determines whether shooting (input of video data) is complete. If the CPU 401 determines that shooting is complete (YES in step S726), the processing is terminated. If the CPU 401 does not determine that shooting is complete (NO in step S726), the process returns to step S723 to continue the processing. In this manner, the CPU 401 repeats the input and storage of annotation information. In contrast, if the CPU 401 determines in step S723 that there is no annotation information is input (NO in step S723), the process advances to step S726.

Operation of Information Input Apparatus 104

Figure 7D:
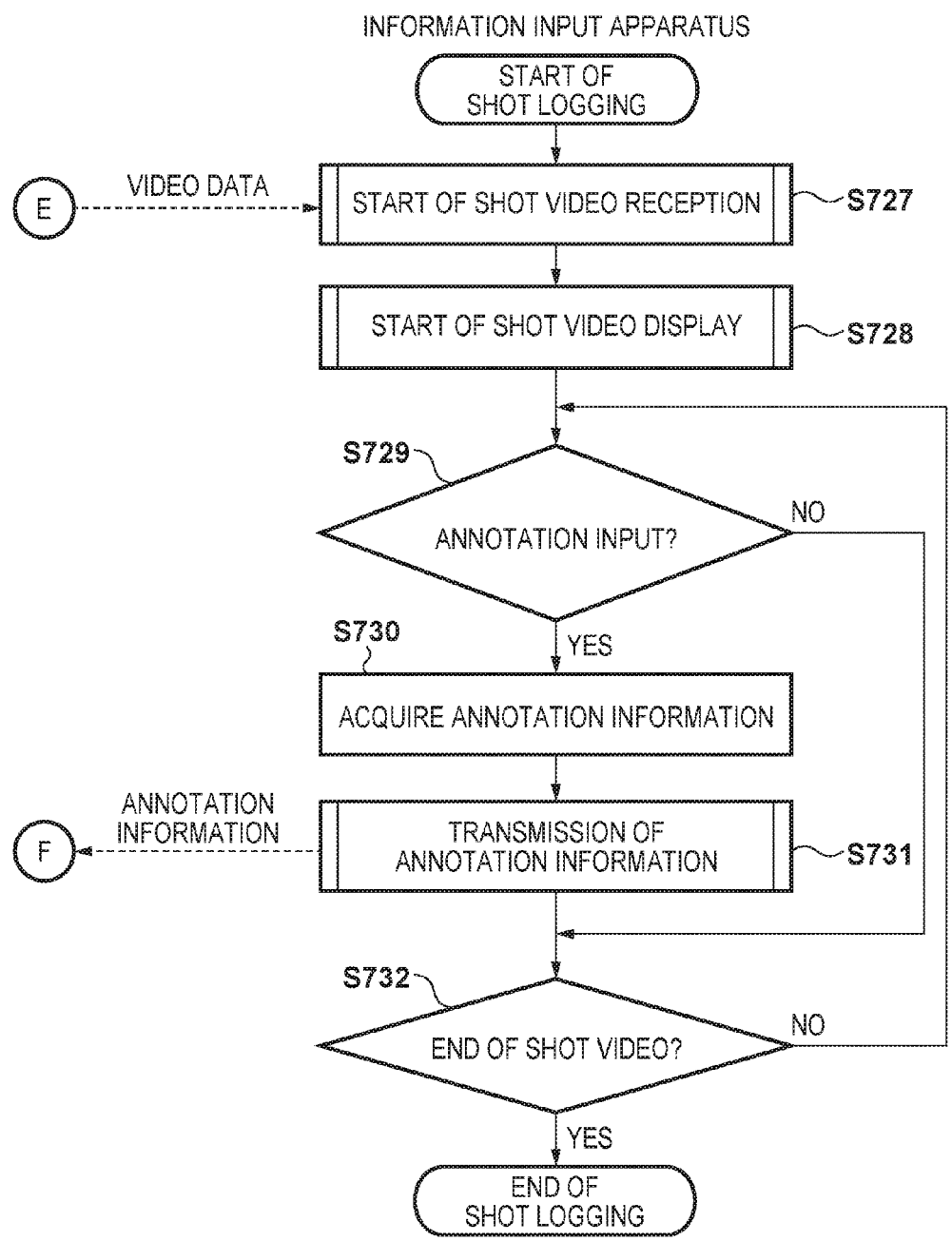
FIG. 7D is a flowchart for explaining a logging operation for annotation information.

FIG. 7D is a flowchart for explaining processing to be executed by the information input apparatus 104 when shooting a shot. FIGS. 6A to 6C each show a screen example of the information input apparatus 104 when shooting a shot. Each step in FIG. 7D is executed under the control of the CPU 501 of the information input apparatus 104.

In step S727, the CPU 501 starts to receive video data transmitted from the data storage apparatus 103, that is, a video during shooting by the camera apparatus 102, and starts to display a video from the information input apparatus 104 on the screen 602 in step S728.

In this case, when a director or staff wants to add some annotation information on the screen 602 of a video during shooting, he/she touches the screen 602. This generates annotation information concerning the time when he/she has touched the screen when the timing of an action call is the start time (0 sec) and the coordinate position of the touch on the screen. The CPU 501 determines in step S729 whether such annotation information is input. If such information is input (YES in step S729), the process advances to step S730. If such information is not input (NO in step S729), the process advances to step S732. When annotation information is generated by a touch on the screen 602 or the like, the CPU 501 determines that annotation information is input (YES in step S729). The process advances to step S730.

In step S730, the CPU 501 acquires the type information of the annotation. The type information of the annotation is information specifying the type of annotation. In this embodiment, such pieces of information are categorized according to a plurality of levels of layers. Pieces of information such as the large classification 909, the small classification 910, and the tag 911 shown in FIG. 9B are specific examples of pieces of type information of annotations. These pieces of type information of annotations are associated with the short cut buttons 604 in advance. That is, an annotation type is determined by selectively touching one of the short cut buttons 604 before or after touching the screen. In this case, it is possible to scroll the screen by operating the move buttons 605 and 606 on the short cut page to switch between the short cut buttons 604 which can be selected, and to input annotation information including more detailed annotation types and texts. As shown in FIG. 9B, annotation information includes information indicating a positive (Good) feeling or negative (NG) feeling. In addition, annotation information includes a classification (focus or exposure) concerning a camera command. Note that "fine", "Yes", "stay", and the like may be used as positive words. In addition, "bad", "No", "No way", "change", and the like may be used as negative words. Furthermore, a negative word can be arbitrarily set, and the selection of a predetermined word may be determined as the issuance of a modification instruction.

In step S731, the confirmed annotation information is transmitted to the data storage apparatus 103 and stored in association with a shot during shooting. Assume that referring to FIG. 6A, while a bust shot of a main character is shot, a director who is checking the screen wants to issue an instruction to focus on an arm of the main character with respect to a camera command to focus on the face of the main character, which has been executed by a camera operator. The following will describe a case in which annotation information is added to the shot. Referring to FIG. 6B, in order to add annotation information, the director touches a place 607 where the arm of the main character on the screen exists to display a cursor mark. With this processing, the time position 907 with reference to the action call and the coordinate position 908 on the screen are confirmed. Thereafter, referring to FIG. 6C, pieces of information such as the large classification 909, the small classification 910, and the tag 911 are confirmed and stored by touching short cut buttons 608.

The CPU 501 repeats such processing until determining the end of video data in step S732 (YES in step S732). That is, the CPU 501 determines whether the shot video has ended. If the CPU 501 determines that the shot video has ended (YES in step S732), the processing is terminated. If the CPU 501 determines that the shot video has not ended (NO in step S732), the process returns to step S729 to continue the processing.

As described above, repeating the operations described with reference to FIGS. 6A, 6B, 6C, 7A, 7B, 7C, and 7D will store annotation information corresponding to each shot during shooting in the data storage apparatus 103. That is, the information input apparatus 104 performs the reception processing of receiving an instruction from the user with respect to an image, and causes the data storage apparatus 103 to hold the instruction as annotation information with respect to the image. Although the above description has exemplified the case in which pieces of annotation type information are associated with short cut buttons in advance, annotation type information may be confirmed by recognizing a text input as a detailed annotation input. A text is input with a software keyboard or the like.

(Conversion Processing)

A processing procedure for converting annotation information into a camera command in this embodiment will be described next with reference to FIGS. 8, 9A, and 9B. When shot shooting is complete, the processing shown in FIG. 8 is executed. Each step in FIG. 8 is executed under the control of the CPU 401 of the data storage apparatus 103.

First of all, in step S801, the CPU 401 extracts annotation information added to a complete shot. More specifically, the CPU 401 extracts annotation information assigned with the same shot ID. For example, annotation information assigned with RC01-S12-S09 corresponds to a record group 912 shown in FIG. 9B.

The CPU 401 then repeats the processing from step S802 to step S807 and executes the processing from step S803 to step S806 with respect to each extracted annotation.

In step S803, the CPU 401 reads out annotation information. In step S804, the CPU 401 identifies, based on the readout annotation information, whether the annotation information is a camera command generation target. In this case, the CPU 401 identifies whether the information is a camera command generation target, based on whether a specific item of the annotation information corresponds to information associated with a camera command (setting information). In the case shown in FIG. 9B, for example, annotation information which corresponds to "camerawork" in "Large Classification" is a command generation target. Whether annotation information is a command generation target may be determined according to "Small Classification". For example, pieces of annotation information concerning camera settings such as a focus, exposure, and zoom are command generation targets.

In step S804, first of all, the CPU 401 identifies annotation information 913 as a camera command generation target, which corresponds to "camerawork" as the large classification 909, "NG" as the tag 911, and "0017" as an annotation ID shown in FIG. 9B. Note that "NG" means that the shooting is not good, and re-shooting (retaking of an image) is required. "GOOD" means that the shooting is good, and retaking of an image is not required.

With respect to the annotation identified as a target in step S804, the CPU 401 then generates a camera command based on the annotation information in step S805. In this embodiment, the CPU 401 generates a camera command, as needed, based on the values of the time position 907, the coordinate position 908, and the like in accordance with the content of the small classification 910. For example, the record 913 shown in FIG. 9B includes "focus" as the small classification 910. In step S805, the CPU 401 generates a camera command to inhibit the autofocus processing of automatically focusing on the position indicated by the coordinate position 908 at the shooting time indicated by the time position 907. Note that since the information indicated by the tag is negative, such a camera command to inhibit autofocus is generated. In step S806, the generated camera command is transmitted to the camera apparatus 102.

Note that when generating a camera command by using the annotation information with the annotation ID "0020" as a target, since the positive tag is added, the CPU 401 generates a camera command to execute autofocus processing. That is, the CPU 401 generates a camera command to execute the autofocus processing of automatically focusing on the position indicated by the coordinate position 908 at the shooting time indicated by the time position 907.

The camera command generated in this manner is transmitted from the camera command transmission unit 321 of the data storage apparatus 103, received by the camera command reception unit 313 of the camera apparatus 102, and recorded on the recording unit 311. In this case, if a camera command with the same time position as that included in the received camera command has already been recorded, the processing of overwriting the received camera command may be executed. In addition, whether a given time position is the same as the above time position may be determined with reference to ranges before and after a predetermined time T. Alternatively, when repeatedly shooting the same shot, the invoking unit 308 may invoke camera commands recorded on the recording unit 311 in accordance with the time positions added to the camera commands. That is, making the execution unit 309 read out the camera command makes it possible to execute a camera operation reflecting an attention point indicated by annotation information. If, for example, the camera command is associated with a focus, the execution unit 309 controls the shooting unit 304 to, for example, focus on the position indicated by the camera command at the timing indicated by the camera command. If the camera command is associated with zoom, the execution unit 309 controls the shooting unit 304 to, for example, set the zoom magnification indicated by the camera command at the timing indicated by the camera command.

As described above, according to this embodiment, annotation information input to the information input apparatus 104 based on operator's (for example, director's) attention point during shooting is converted into a camera command which can be executed by the execution unit 309. This makes it possible to perform a camera operation based on an attention point at the time of shooting a shot in the past in a similar situation.

Although this embodiment has exemplified the camera command as a focusing operation, this is not exhaustive. For example, a camera command may be configured to execute an adjusting operation associated with the camera, such as a zoom magnification operation, aperture value adjusting, white balance adjustment, or execution/non-execution of camera shake correction, or ISO sensitivity adjustment or a positioning operation associated with the camera body, such as tilting or panning.

In addition, in this embodiment, information (additional information) included in annotation information is set from a selected short cut button. However, as a technique of setting additional information, it is possible to use a text input technique, speech input technique, a touch operation gesture input technique, or the like. In addition, annotation additional information to be referred to for the generation of a camera command is not limited to a coordinate position. An operation value input by a text may be recorded as additional information. Furthermore, for example, an object may be detected at a coordinate position, and a camera command may be generated with respect to the coordinate position at which the object exists.

In addition, this embodiment has exemplified the case in which this shooting system is constituted by a plurality of apparatuses. However, some apparatuses may be configured to incorporate other apparatuses. In addition, they may be integrated into a single apparatus.

The above embodiment is configured to convert annotation information including a specific modification instruction concerning a camera operation into a camera command. In contrast to this, another embodiment of the present invention is configured to determine the presence/absence of a modification instruction from annotation information and switch between camera command conversion techniques.

(Functional Arrangement)

FIG. 10 is a block diagram for explaining the functional blocks of an overall shooting system according to this embodiment. This functional arrangement is the same as that of the above embodiment shown in FIG. 3 except for a camera apparatus 102, and hence a description will be omitted. In addition, functional blocks 302 to 313 of the camera apparatus 102 are the same as those in the above embodiment. This embodiment additionally includes an input support display unit (camera operation input support display unit) 1001 for displaying input support information concerning a camera operation on the finder screen 303. Display processing on the input support display unit 1001 is performed by causing the execution unit 309 to execute a camera command concerning display. In this arrangement, the shooting system according to the embodiment executes storage of data and addition of annotation information in accordance with the same processing procedures as those shown in FIGS. 7A to 7D as in the above embodiment.

(Conversion Processing)

Figure 11:
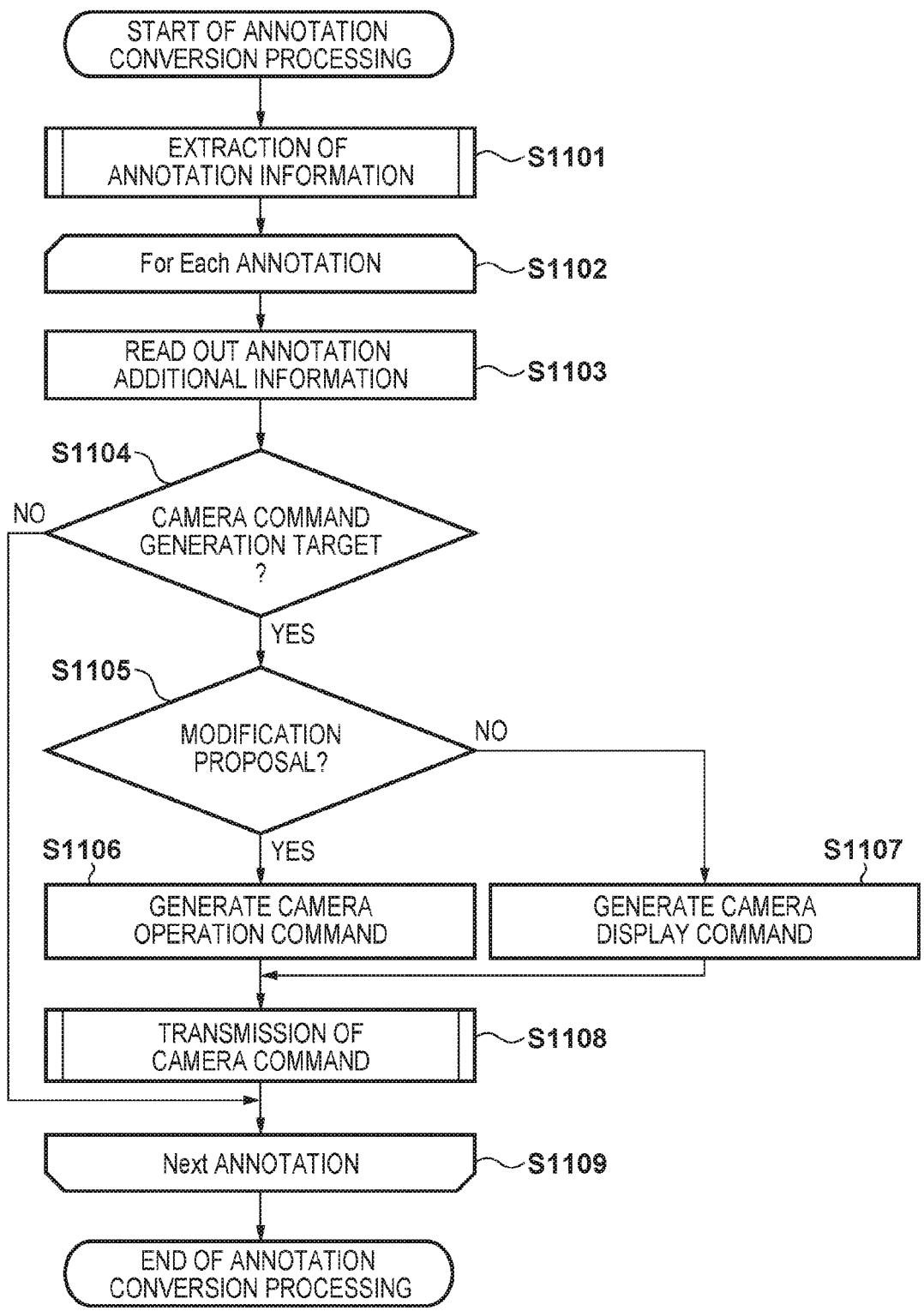
FIG. 11 is a flowchart for explaining a camera command converting operation for annotation information.

FIG. 11 is a flowchart for explaining processing to be executed by a data storage apparatus 103 when converting annotation information into a camera command. When shot shooting is complete, the processing shown in FIG. 11 is executed. Although most of the processing procedure is the same as the operation in FIG. 8 in the above embodiment, the procedure in FIG. 11 additionally includes step S1105 of determining whether an annotation includes a modification instruction and step S1107 of generating a camera command concerning camera display.

FIGS. 12A, 12B, 12C, 12D, and 12E are views for explaining the finder screen of the camera apparatus 102 which shoots a shot and the operation screen of an information input apparatus 104 in this embodiment. FIG. 13 shows a sample of annotation information stored in the data storage apparatus 103 upon execution of the operations shown in FIGS. 12A, 12B, 12C, 12D, and 12E. A processing procedure for converting annotation information into a camera command in this embodiment will be described with reference to FIGS. 11 to 13. Each step in FIG. 11 is executed under the control of a CPU 401 of the data storage apparatus 103.

Figure 12A:
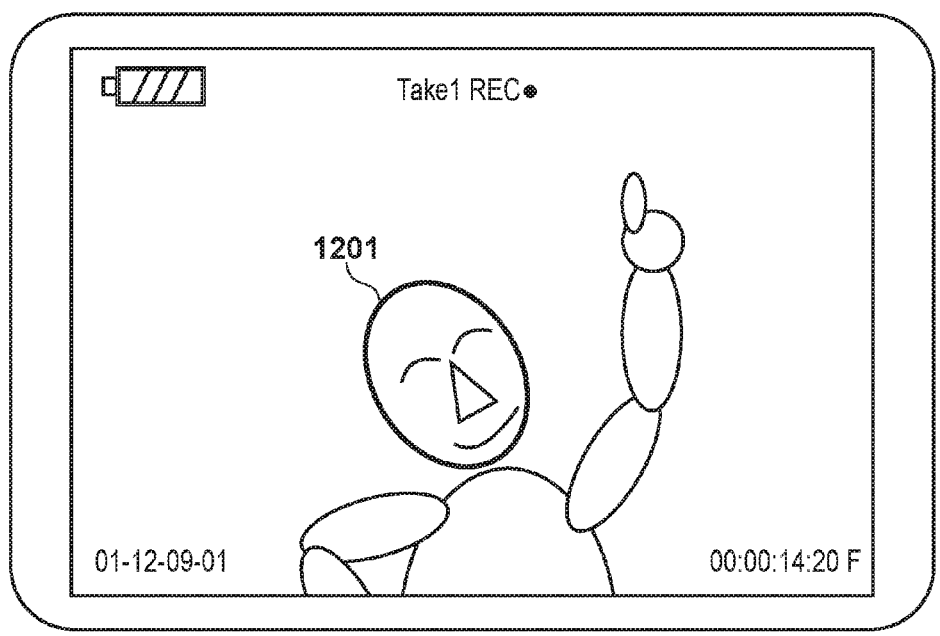
FIG. 12A is a view for explaining a screen of a camera apparatus at the time of shooting.
Figure 12B:
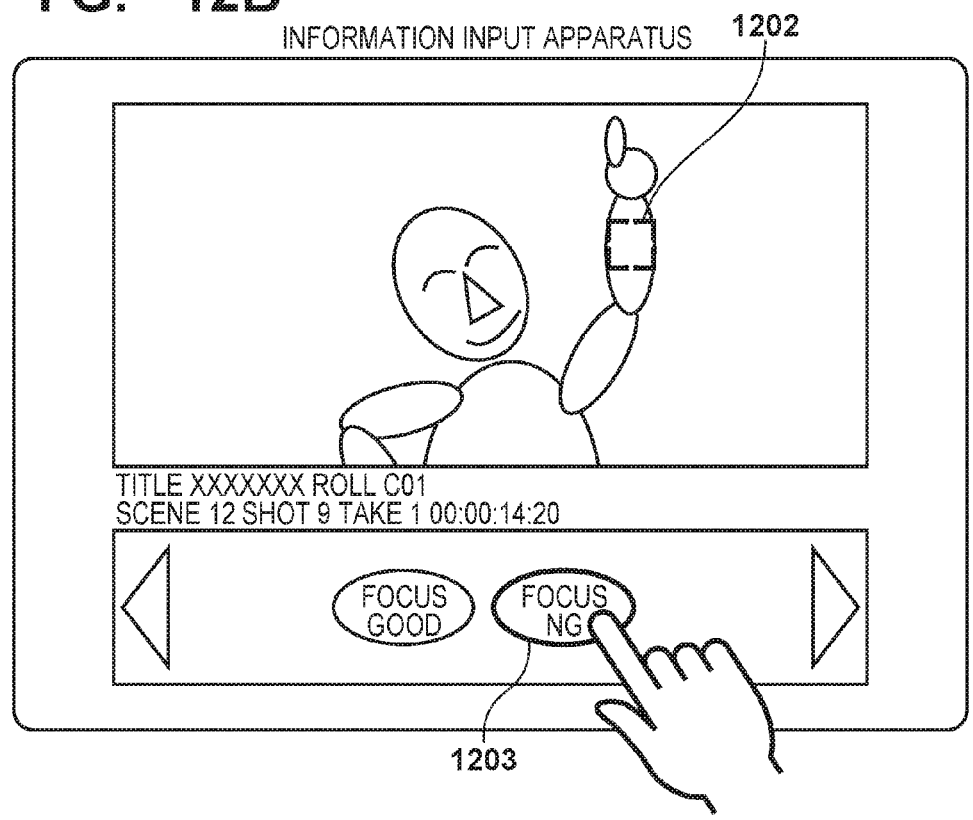
FIG. 12B is a view for explaining a screen of an information input apparatus at the time of shooting.
Figure 12C:
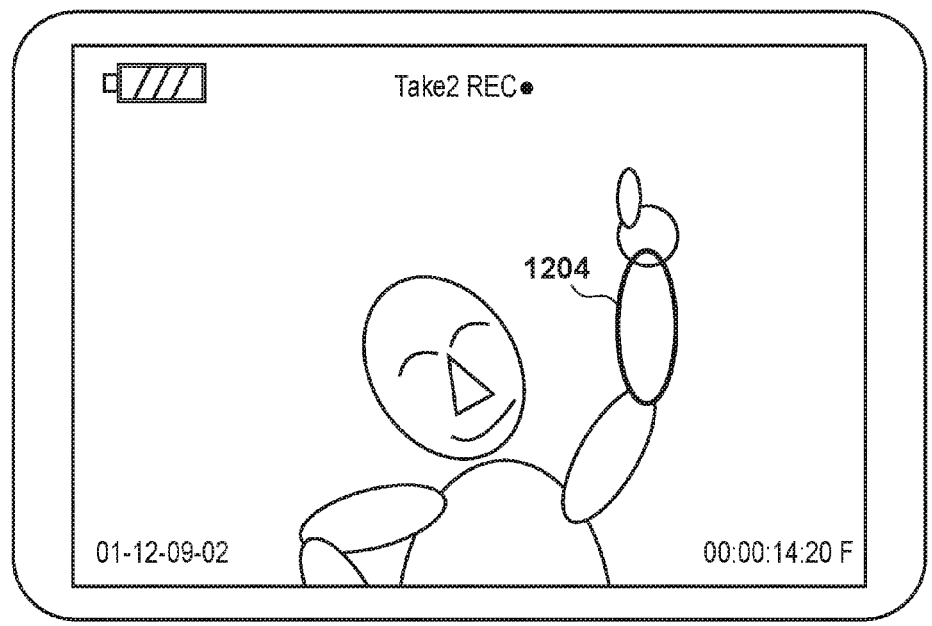
FIG. 12C is a view for explaining a screen of the camera apparatus at the time of shooting.

FIG. 12A is a view showing the finder screen 303 of the camera apparatus 102 of the camera operator at the time of take 1 shooting. FIG. 12B is a view showing how a director inputs annotation information by using the information input apparatus 104. Consider a case in which the camera operator executes a camera operation 1201 to focus on the face of a main character as shown in FIG. 12A, meanwhile the director inputs an instruction to focus on an arm of the main character to the shooting system as shown in FIG. 12B. In this case, the director touches a place 1202 where the arm of the main character on the screen has existed, and touches a short cut button 1203 to add a negative annotation including a modification instruction.

In this case, the annotation information is recorded as a record 1301 in FIG. 13. Subsequently, at the same time as the end of take 1 shooting, the CPU 401 executes the annotation conversion processing shown in FIG. 11. First of all, in step S1101, the CPU 401 extracts annotation information. In steps S1102 to S1109, the CPU 401 executes the processing in steps S1103 to S1108 for each extracted annotation information. First of all, in step S1103, the CPU 401 reads out additional information included in an annotation.

In step S1104, the CPU 401 identifies, based on the readout additional information, whether the additional information 1301 is a camera command generation target. If the information is a camera command generation target (YES in step S1104), the process advances to step S1105. Otherwise (NO in step S1105), the process advances to step S1109 to proceed with processing for the next annotation information. In the case of the additional information 1301, the additional information read in step S1103 includes "camerawork" as a large classification 909 and "NG" as a tag 911 shown in FIG. 13. This information is therefore identified as a camera command generation target (YES in step S1104). The process therefore advances to step S1105.

In step S1105, the CPU 401 determines whether the annotation information as a camera command generation target includes a modification instruction from the director. It is possible to determine whether the information includes a modification instruction based on whether a tag or comment includes a negative word. Although examples of negative words are the same as those in the above embodiment, the selection of a predetermined word may be determined as the issuance of a modification instruction. Upon determining that the information includes a modification instruction (YES in step S1105), the CPU 401 generates a camera operation command in step S1106 and transmits the command to the camera apparatus 102 in step S1108. A camera operation command is a camera command defining an operation associated with camerawork. Upon determining that the information includes no modification instruction (NO in step S1105), the CPU 401 generates a camera display command in step S1107, and transmits the command to the camera apparatus 102 in step S1108. A camera display command is a camera command to cause the finder display unit 305 of the camera apparatus 102 to perform display for supporting the operation of the camera apparatus 102.

In the above case of the additional information 1301, a coordinate position 908 shown in FIG. 13 is recorded, and information indicating "focus" is input in association with a negative word. The CPU 401 therefore determines in step S1105 that the information includes a modification instruction (YES in step S1105). In step S1106, the CPU 401 executes a camera command corresponding to the additional information 1301 of the annotation in which "focus" is set in a small classification 910. More specifically, the CPU 401 generates a camera command for executing autofocus processing with reference to a time position 907 ("00:00:45:20") and the coordinate position 908 ("(400, 300)") included in the additional information 1301. In step S1108, the CPU 401 transmits the camera operation command generated in step S1106 to the camera apparatus 102. With the above processing, when performing take 2 shooting, it is possible to perform an autofocusing operation 1204 based on the modification instruction in the annotation shown in FIG. 12C.

Figure 12D:
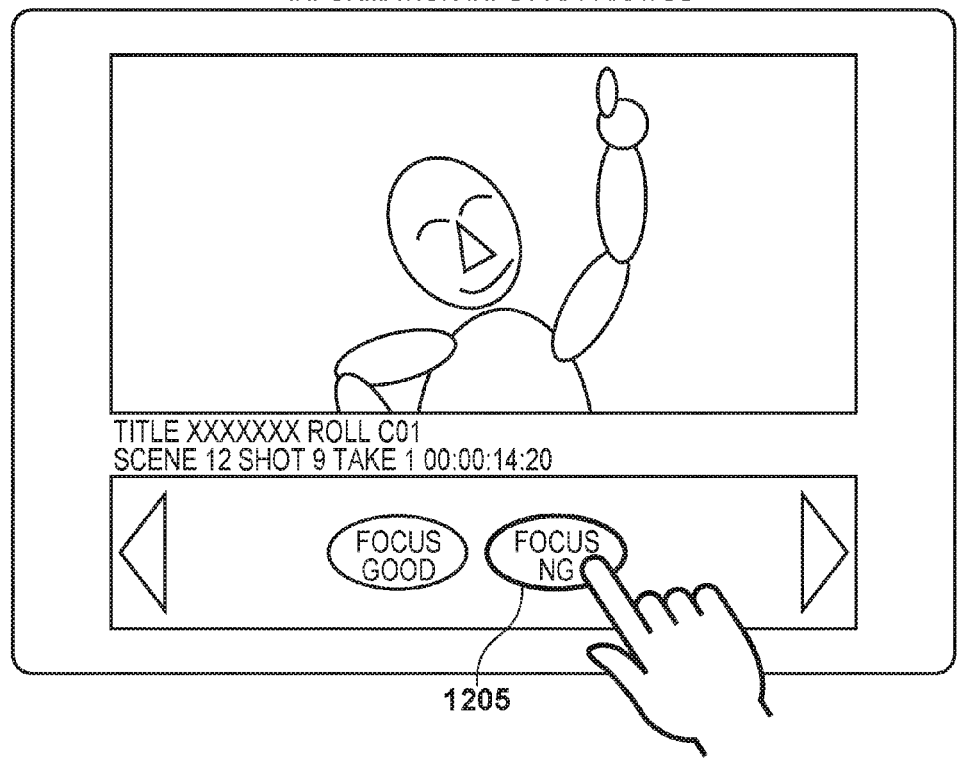
FIG. 12D is a view for explaining a screen of the information input apparatus at the time of shooting.
Figure 12E:
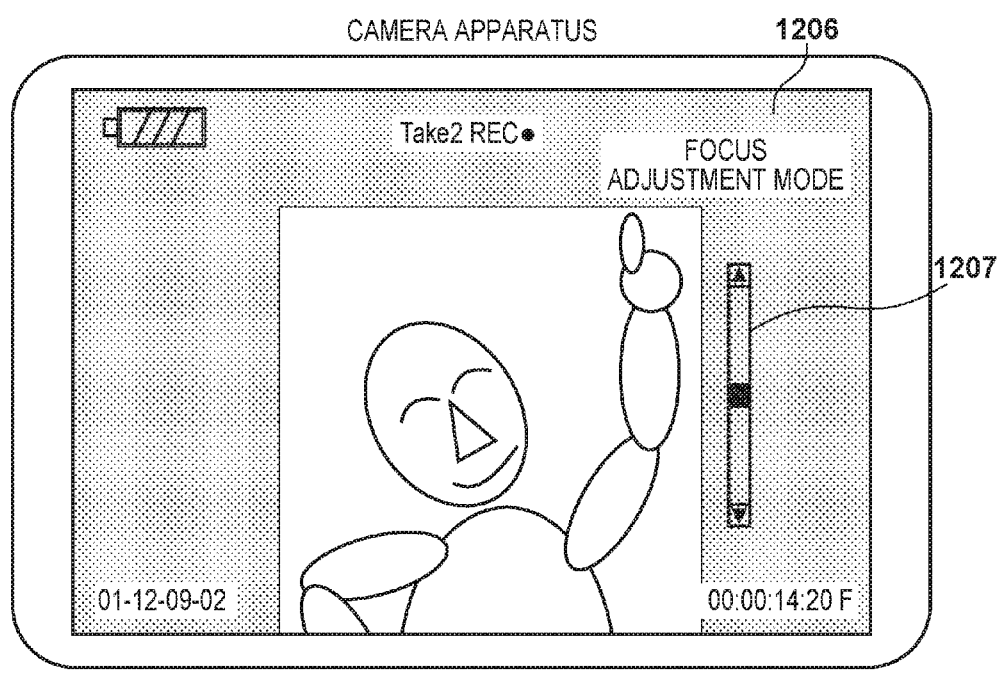
FIG. 12E is a view for explaining a screen of the camera apparatus at the time of shooting.

An example of an operation to be performed when generating a camera display command will be described next. FIG. 12D is a view showing an annotation instruction issued by the direction with the information input apparatus 104 at the time of take 1 shooting as in the case shown in FIG. 12B. The following is a case in which in order to indicate an instruction to redo a focusing operation, the director touches a short cut button 1205, without touching the shot view screen, to add a negative annotation including no specific modification instruction. The annotation information in this case is recorded as a record 1302 in FIG. 13. Subsequently, at the same time as the end of take 1 shooting, the CPU 401 executes the annotation conversion processing shown in FIG. 11. The CPU 401 starts to process from step S1101, and reads out the annotation additional information 1302 in step S1103. In step S1104, the CPU 401 identifies the annotation additional information 1302 as a camera command generation target because the large classification 909 shown in FIG. 13 in the information is "camerawork", and the tag 911 is "NG" (YES in step S1104). The process therefore advances to step S1105.

In step S1105, since no information is recorded at the coordinate position 908 of the annotation additional information 1302, the CPU 401 determines that no specific modification instruction is included (NO in step S1105). The process therefore advances to step S1107.

In step S1107, the CPU 401 generates a command corresponding to the small classification 910 of the annotation additional information 1302. In the above case, the CPU 401 generates an operation support display camera command instructing to display a menu image such as a GUI for allowing the camera operator to perform a focusing operation at a time position 907 ("00:00:45:20") of the additional information 1302. In step S1108, the CPU 401 transmits the generated operation support display camera command to the camera apparatus 102.

In this manner, at the time of take 2 shooting, the CPU 401 executes the transmitted operation support display camera command concerning a focusing operation. That is, it is possible to change the display form of the finder screen into a screen including a GUI of a focusing operation screen 1206 shown in FIG. 12E at the timing indicated at the time of take 1 shooting, and to display a panel 1207 which allows an easy focusing operation. Note that an operation support display technique to be used is not limited to this form, and annotation information may be superimposed/displayed to call attention.

As described above, this embodiment is configured to determine from annotation information whether there is a modification instruction (a modified camerawork instruction), and switch and execute a camera command conversion technique in accordance with the determination result. This makes it possible to implement both a camera operation and its support based on an attention point at the time of past shot shooting in a similar situation.

Although this embodiment has exemplified the case in which the presence/absence of a modification instruction is determined with reference to whether annotation additional information includes a coordinate position, this is not exhaustive. For example, the embodiment may be provided with a short cut button for adding information explicitly indicating the presence/absence of a modification instruction. Alternatively, an object such as a person may be detected at an added coordinate position, and it may be determined that there is a specific modification instruction if there is an object; otherwise, it may be determined that there is no specific modification instruction, thereby generating an operation support display camera command.

In addition, this embodiment has exemplified the arrangement configured to generate a camera command for the execution of operation support display at the timing indicated by time information included in annotation information. However, in consideration of the delay of the timing of adding an annotation from the timing of executing a camera operation, advance display may be performed a predetermined time T (sec) before the timing of adding the annotation.

The above embodiments have exemplified the arrangement configured to convert annotation information added at the time of immediately preceding shot shooting in a similar situation into a camera command. Still another embodiment of the present invention will exemplify an arrangement configured to convert annotation information added at the times of all past shot shooting operations in similar situations into camera commands.

(Functional Arrangement)

Figure 14:
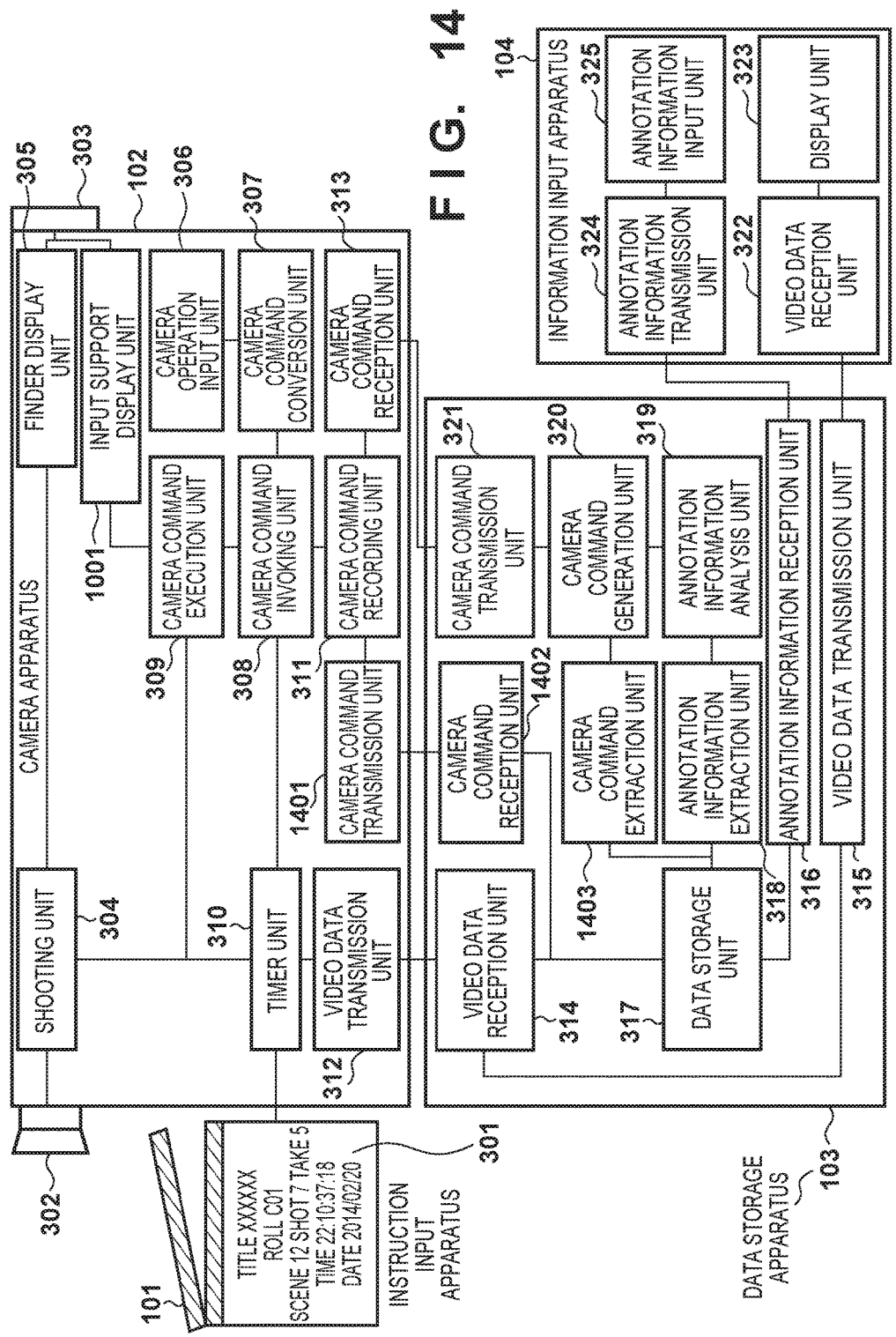
FIG. 14 is a block diagram showing the internal arrangement of a shooting system.

FIG. 14 is a block diagram for explaining the functional blocks of the overall shooting system according to this embodiment. This system is the same as that according to the above embodiment in FIG. 3 except for the arrangements of a camera apparatus 102 and a data storage apparatus 103, and hence a detailed description will be omitted.

Functional blocks 302 to 313 and 1001 of the arrangement of the camera apparatus 102 are the same as those in the above embodiment described with reference to FIG. 10. In this embodiment, the camera apparatus 102 additionally includes a camera command transmission unit 1401 which transmits a camera command recorded on the recording unit 311 to the data storage apparatus 103.

The data storage apparatus 103 includes a camera command reception unit 1402 which receives a camera command transmitted from the camera apparatus 102. The data storage apparatus 103 stores, in a data storage unit 317, a camera command received by the camera command reception unit 1402 as shot data associated with video data received by a video data reception unit 314. Using this arrangement makes it possible to store a history of camera commands in each shot shooting. In addition, the data storage apparatus 103 includes a camera command extraction unit 1403 which extracts a camera command corresponding to an associated shot from shot data stored in the data storage unit 317. When extracting camera commands, the camera command extraction unit 1403 extracts, as associated shots associated with a shot received by the video data reception unit 314, other takes belonging to the same shot, and takes belonging to preceding and succeeding shots.

(Shooting Processing)

FIGS. 15A, 15B, 15C, and 15D are flowcharts for explaining processing to be executed by the camera apparatus 102, an instruction input apparatus 101, the data storage apparatus 103, and an information input apparatus 104 when shooting a shot. FIG. 16 is a flowchart for explaining the processing of converting annotation information into a camera command in the arrangement according to this embodiment. FIGS. 17A, 17B, 17C, 17D, and 17E are views for explaining the finder screen of the camera apparatus 102 which shoots a shot and the operation screen of the information input apparatus 104 in the embodiment. FIG. 18 is a view showing a sample of annotation information stored in the data storage apparatus 103 when performing the operations shown in FIGS. 17A, 17B, 17C, 17D, and 17E. Processing performed by the arrangement according to the embodiment will be described in detail with reference to FIGS. 15A to 18.

Figure 15A:
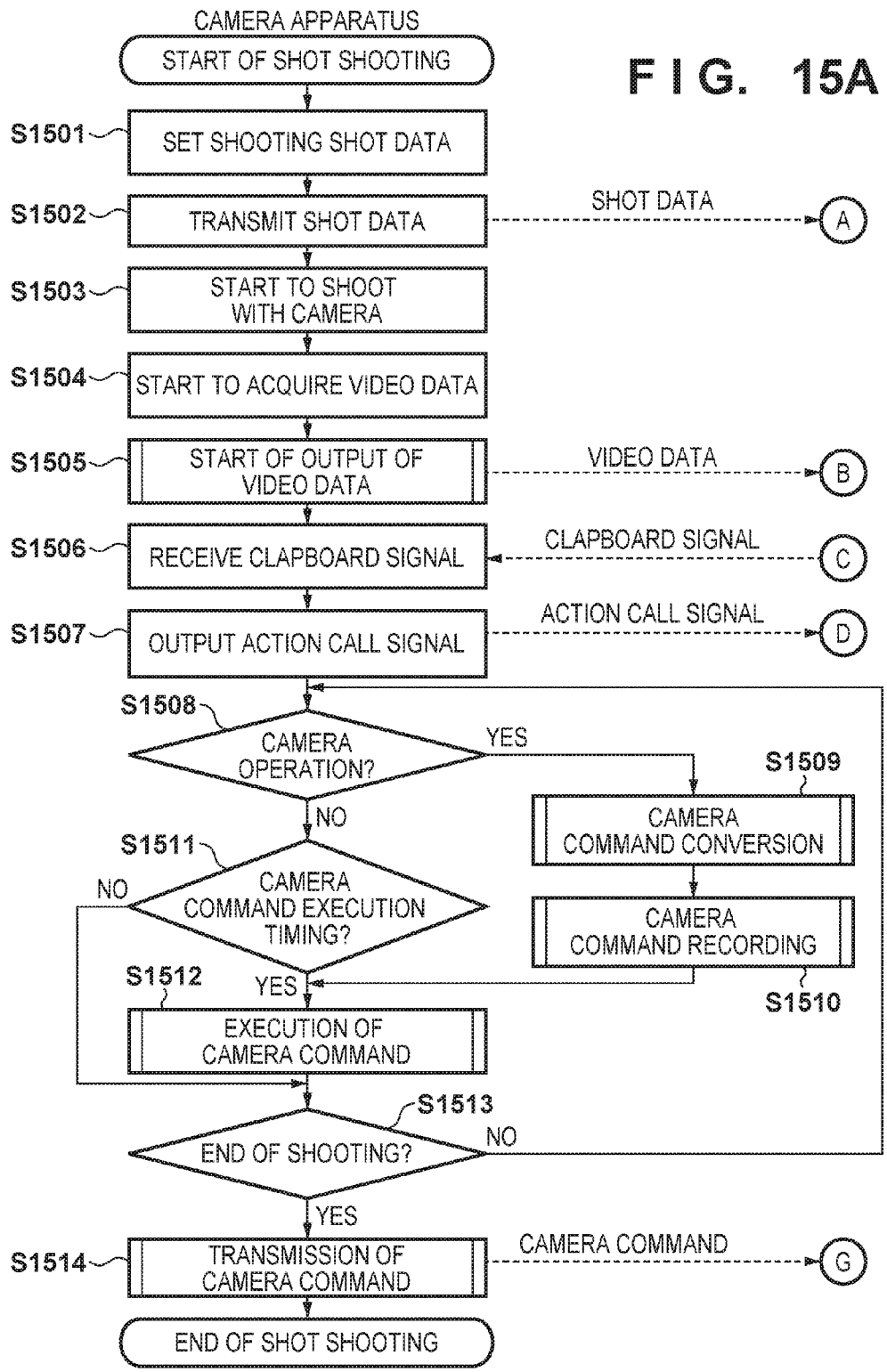
FIG. 15A is a flowchart for explaining a logging operation for annotation information.
Figure 16:
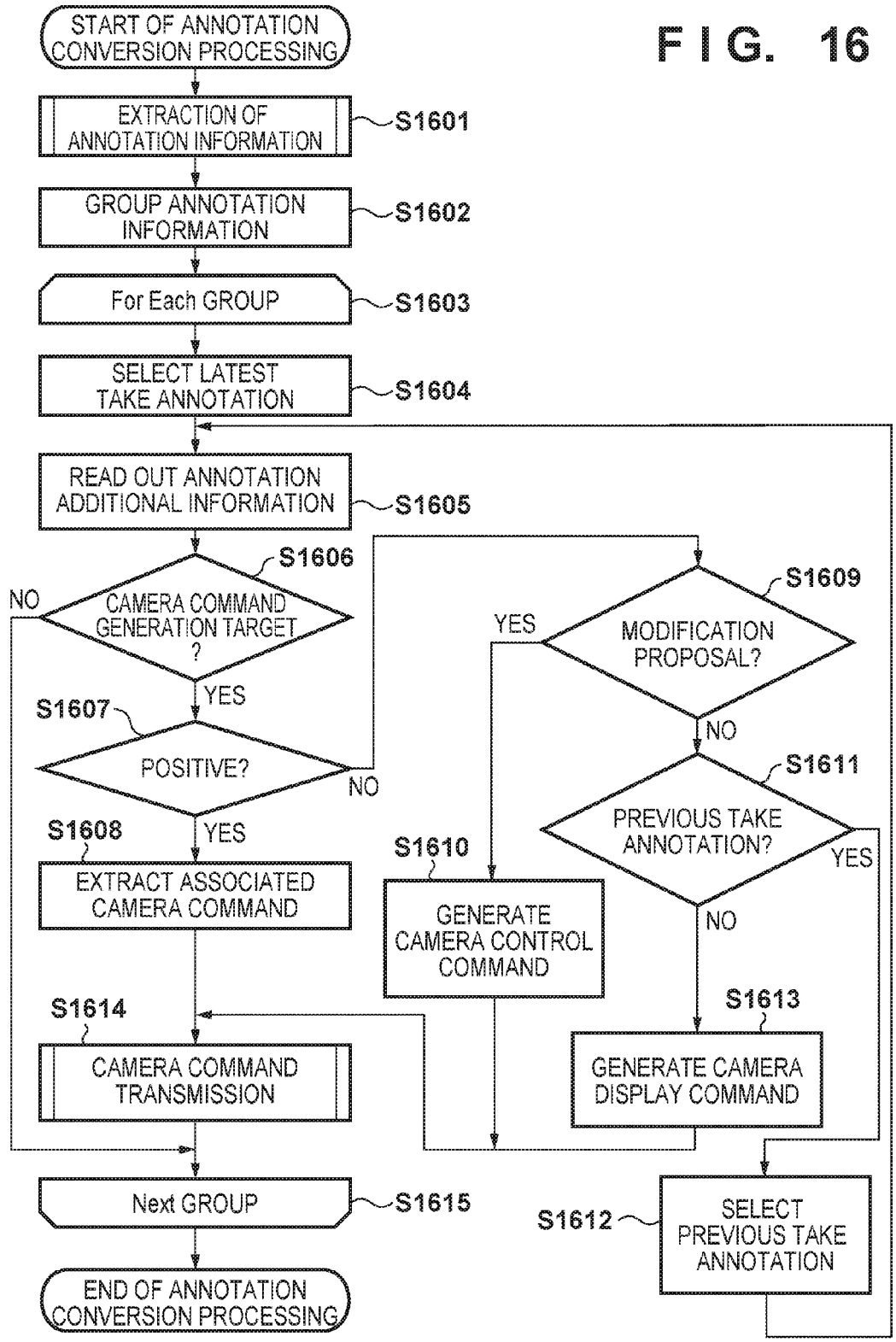
FIG. 16 is a flowchart for explaining a camera command conversion operation for annotation information.

FIG. 15A is a flowchart for explaining processing to be executed when the camera apparatus 102 shoots a specific shot. Each step in FIG. 15A is executed under the control of the CPU (not shown) of the camera apparatus 102. Steps S1501 to S1513 are the same as steps S701 to S713 in FIG. 7A in the above embodiment, and hence a description of them will be omitted. In step S1514, the CPU transmits a camera command recorded on the recording unit 311 to the data storage apparatus 103.

Figure 15B:
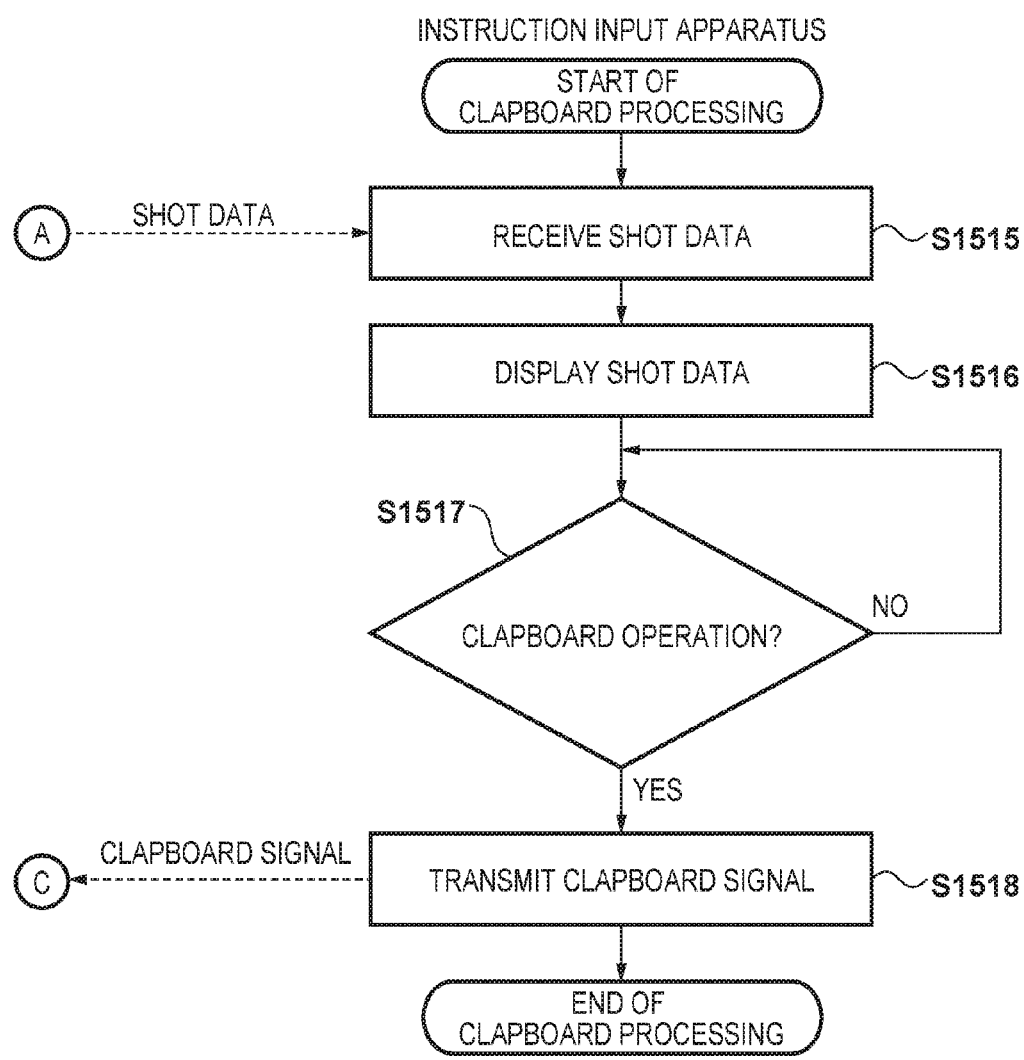
FIG. 15B is a flowchart for explaining a logging operation for annotation information.
Figure 15C:
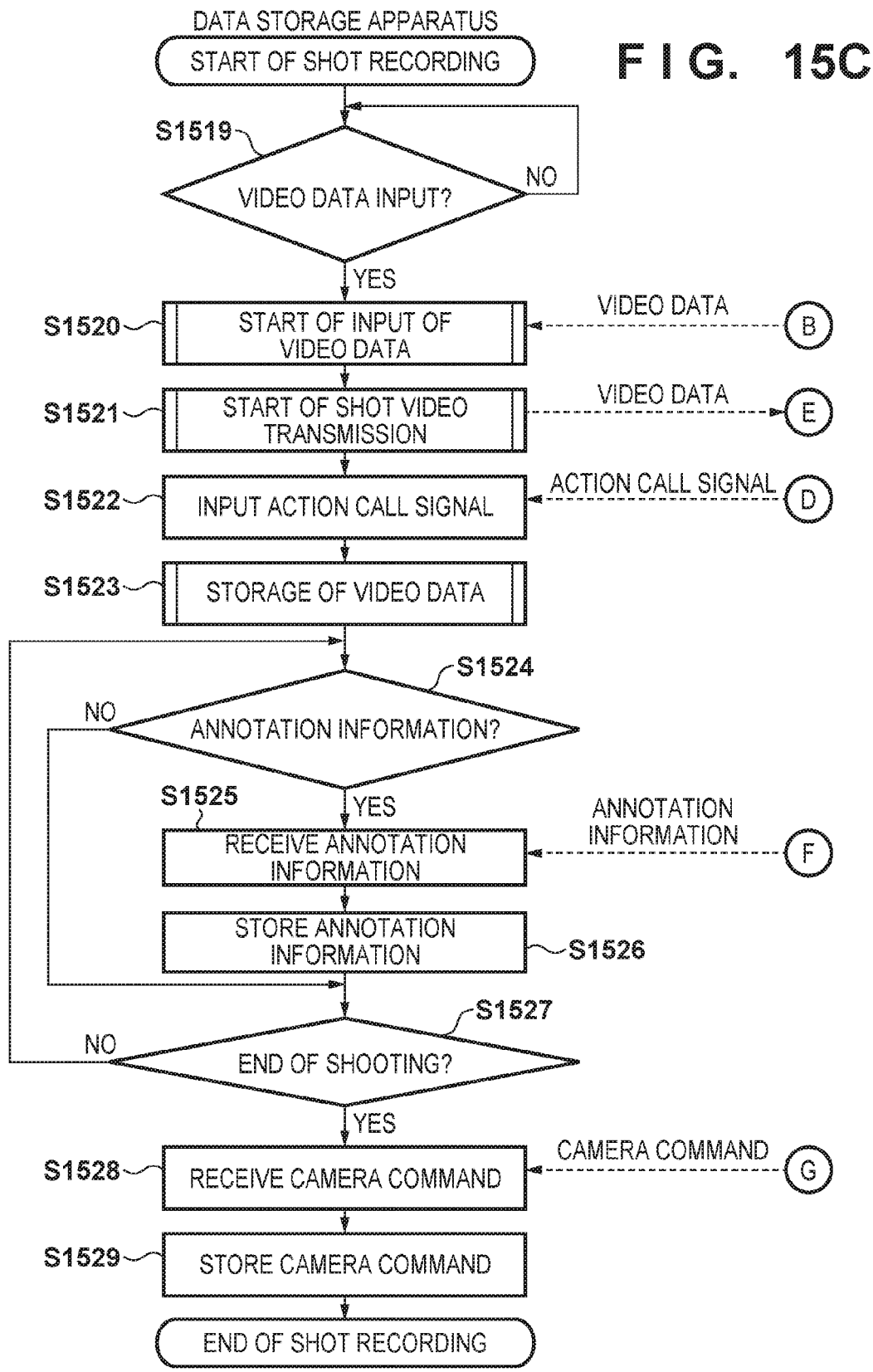
FIG. 15C is a flowchart for explaining a logging operation for annotation information.

FIG. 15C is a flowchart for explaining processing to be executed by the data storage apparatus 103 when shooting a shot. Each step in FIG. 15C is executed under the control of a CPU 401 of the data storage apparatus 103. Steps S1519 to S1527 are the same as steps S718 to S726 in FIG. 7C in the above embodiment, and hence a description of them will be omitted. In step S1528, the CPU 401 receives a camera command executed at the time of shot shooting from the camera apparatus 102. In step S1529, the CPU 401 stores, in the data storage unit 317, the camera command received in step S1528 in association with shot data during shooting.

Figure 15D:
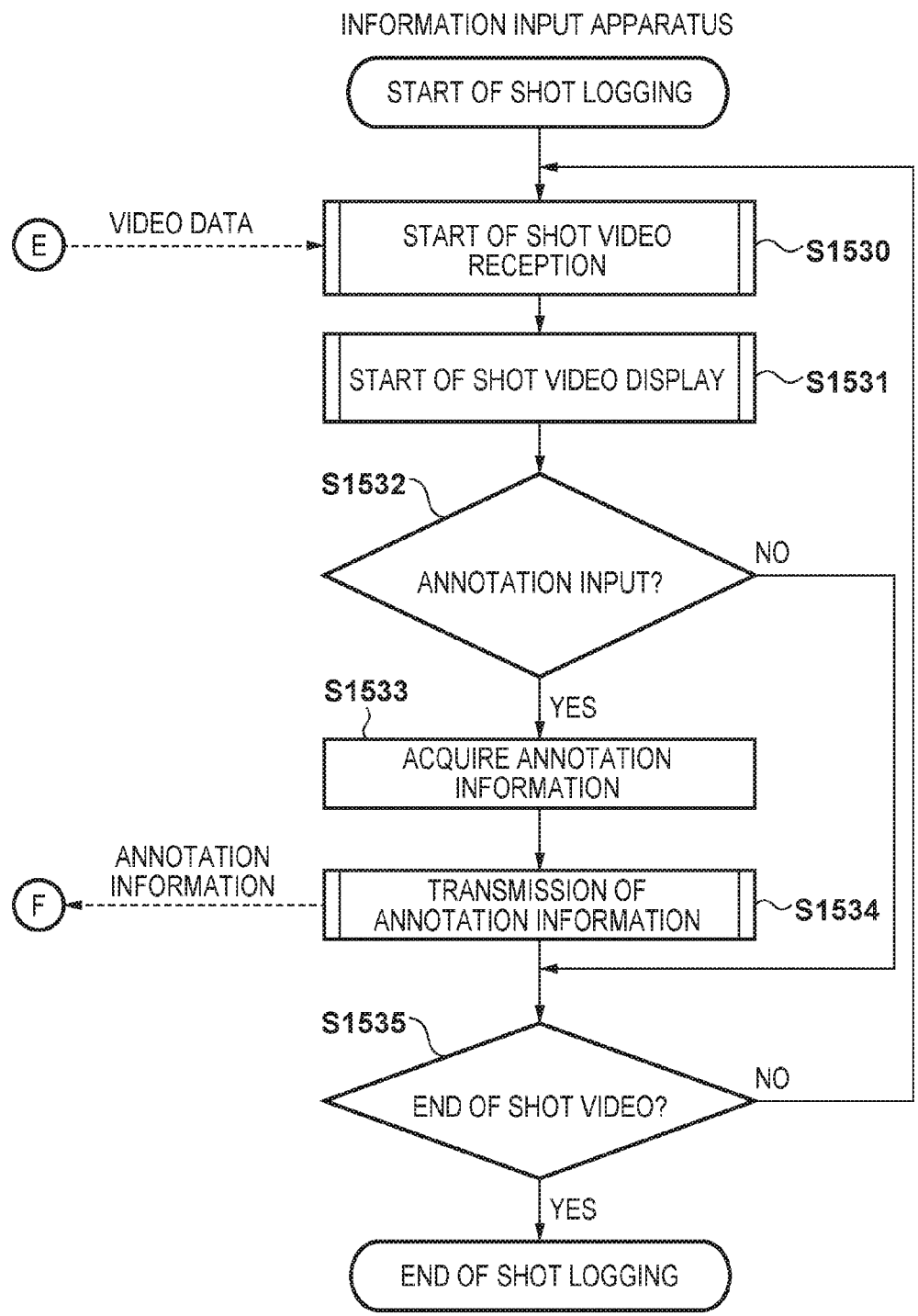
FIG. 15D is a flowchart for explaining a logging operation for annotation information.

The operations in FIGS. 15B and 15D, that is, the operations of the instruction input apparatus and the information input apparatus, are the same as those in FIGS. 7B and 7D in the above embodiment, and hence a description of them will be omitted. Repeating the operations described with reference to FIGS. 15A and 15C in this manner will store camera commands executed at the time of shot shooting during shooting in the data storage apparatus 103.

(Conversion Processing)

Figure 17A:
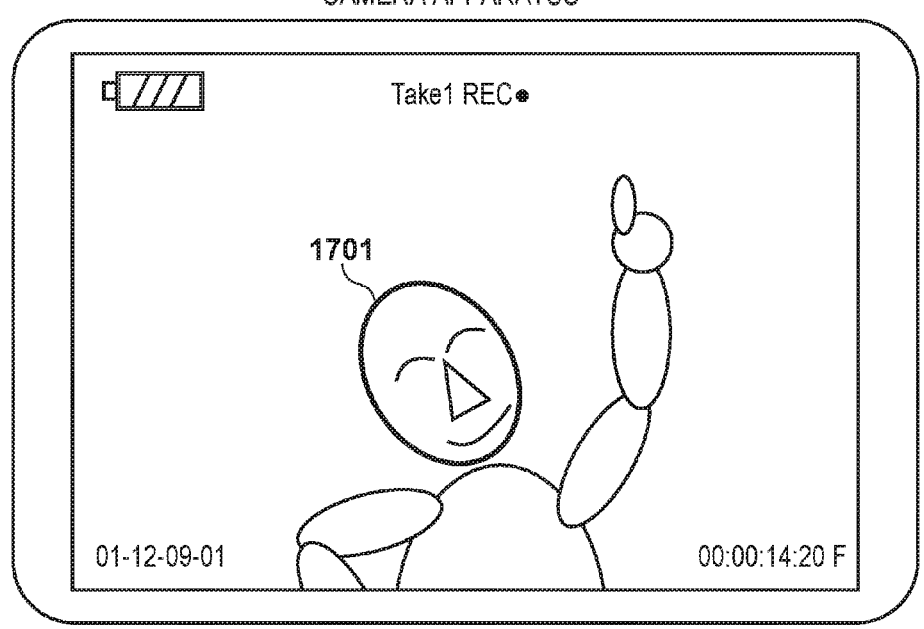
FIG. 17A is a view for explaining a screen of a camera apparatus at the time of shooting.
Figure 17B:
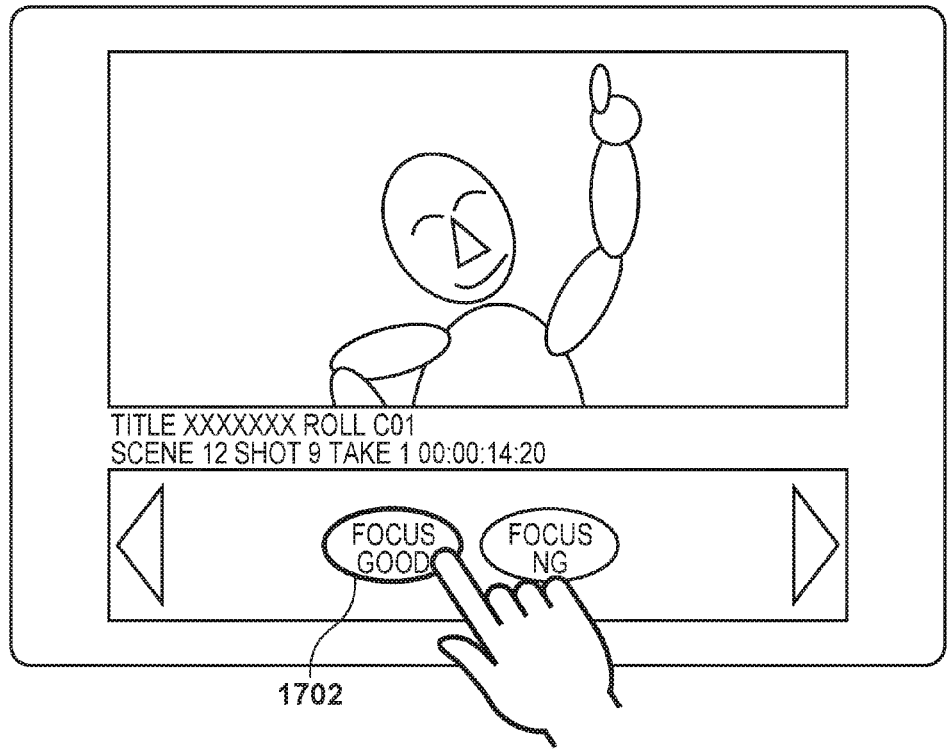
FIG. 17B is a view for explaining a screen of an information input apparatus at the time of shooting.

A processing procedure for converting annotation information into a camera command in this embodiment will be described next with reference to FIGS. 16 to 18. FIG. 17A is a view showing the finder screen 303 to be operated by the camera operator at the time of take 1 shooting. FIG. 17B is a view showing how the director issues an annotation instruction on the information input apparatus 104.

A case in which the camera operator has executed a camera operation 1701 to focus on the face of a main character as shown in FIG. 17A will be described first. Assume that in this case, as shown in FIG. 17B, the director has added a positive annotation by touching a short cut button 1702 so as to indicate that a focusing operation has been good. The annotation information in this case is recorded as a record 1801 shown in FIG. 18.

Figure 17C:
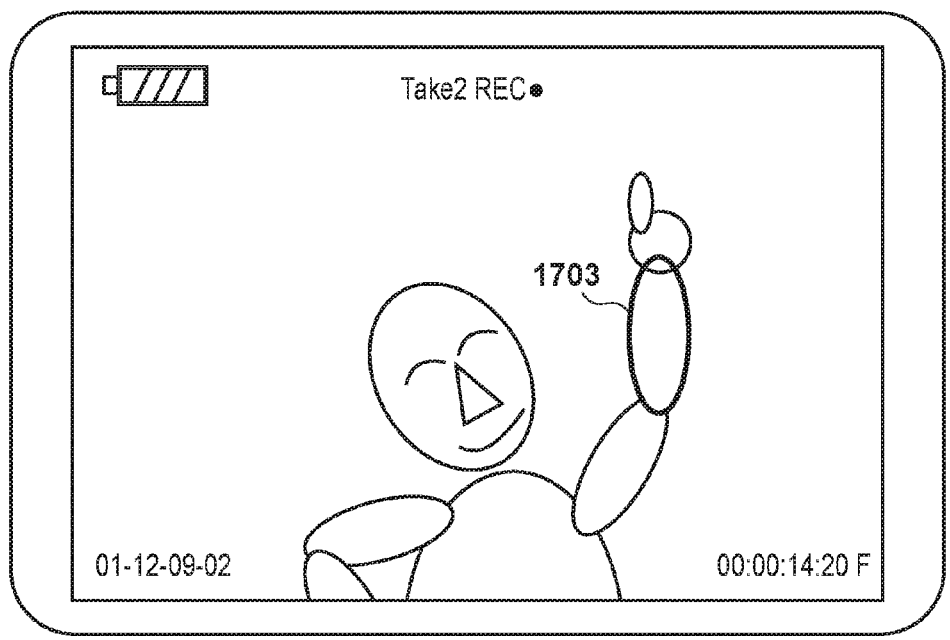
FIG. 17C is a view for explaining a screen of the camera apparatus at the time of shooting.
Figure 17D:
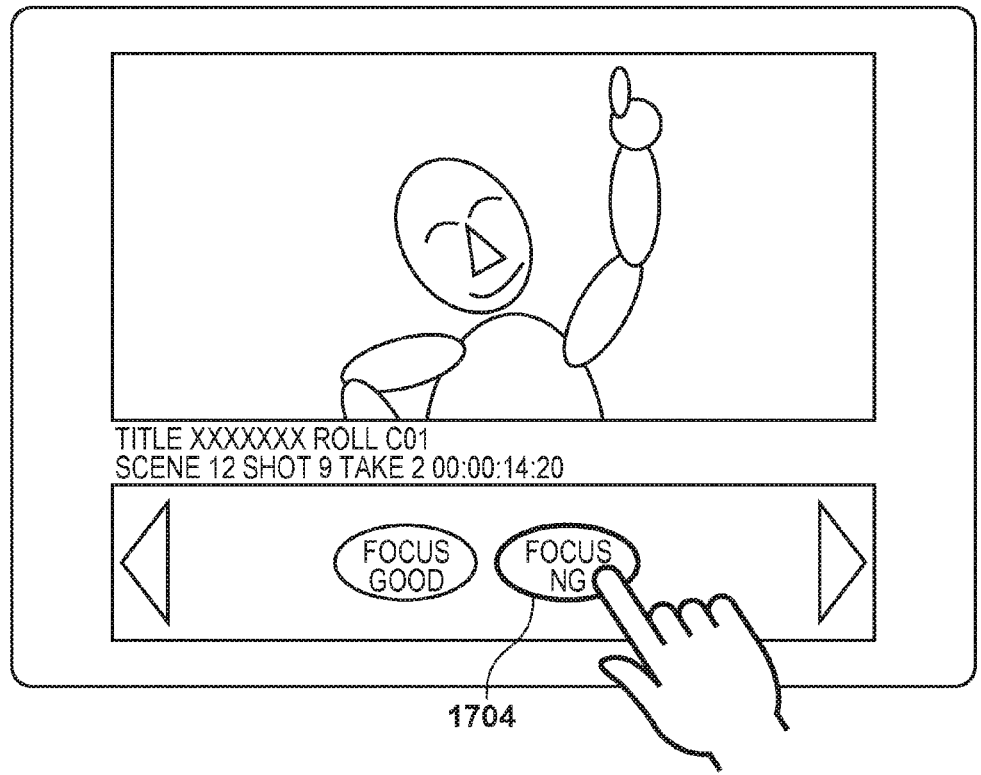
FIG. 17D is a view for explaining a screen of the information input apparatus at the time of shooting.

The next will describe a case in which the camera operator has executed a camera operation 1703 different from the operation of focusing on an arm of the main character at the time of take 1 shooting as a camera operation at the same timing at the time of take 2 shooting as shown in FIG. 17C. Assume that in this case, the director has added a negative annotation including no specific modification instruction by touching a short cut button 1704 without touching the shot video screen so as to indicate an instruction to redo a focusing operation as shown in FIG. 17D. The annotation information in this case is recorded as a record 1802 in FIG. 18.

After the above operation, that is, at the same time as the end of take 2 shooting, the annotation conversion processing shown in FIG. 16 is executed. Each step in FIG. 16 is executed under the control of the CPU 401 of the data storage apparatus 103.

First of all, upon starting processing from step S1601, the CPU 401 groups approximate annotations in step S1602, as described above. Various techniques can be used to determine the approximation of position information of annotation information. For example, in this embodiment, a plurality of pieces of annotation information which are equal in a small classification 910 and do not exceed a predetermined determination reference value, for example, 1 sec, in terms of a time position 907 shown in FIG. 18 are determined as approximate annotation information. Consider, for example, the annotation information shown in FIG. 18. Records 1801 and 1802 are equal in a large classification 909, the small classification 910, and the time position 907, and hence are grouped as the same group.

The CPU 401 then executes processing in steps S1604 to S1614 for each group of annotation information in steps S1603 to S1615. In step S1604, the CPU 401 selects the annotation information added at the time of latest take shooting, that is, the record 1802 of the annotation added to take 2.

In step S1605, the CPU 401 reads out the additional information of the selected annotation, and determines in step S1606 whether the annotation information is a camera command generation target. If the information is a camera command generation target (YES in step S1606), the process advances to step S1607. If the information is not a camera command generation target (NO in step S1606), the process advances to step S1615. For example, since the large classification 909 of the annotation information 1802 is "camerawork", the information is identified as a camera command generation target.

In step S1607, the CPU 401 refers to a tag 911 of the annotation information read out in step S1605 to determine whether a shot associated with the annotation information is positive. If the shot is positive ("GOOD" in the tag 911) (YES in step S1607), the process advances to step S1608. If the shot is not positive ("NG" in the tag 911) (NO in step S1607), the process advances to step S1609. In the above case, since the tag 911 of the additional information 1802 of the annotation is "NG", the annotation is determined as not a positive annotation (NO in step S1607). The process then advances to step S1609.

In step S1609, the CPU 401 determines whether the annotation information includes a specific modification instruction from the director. If the information includes a specific modification instruction (YES in step S1609), the process advances to step S1610. If the information includes no specific modification instruction (NO in step S1609), the process advances to step S1611. In the above case, since the coordinate position 908 is not recorded in the annotation information 1802, the CPU 401 determines that the information includes no specific modification instruction.

In step S1611, the CPU 401 determines whether there is annotation information added at the time of shooting a preceding take shot before the selected annotation information. If there is such information (YES in step S1611), the process advances to step S1612. If there is no such information (NO in step S1611), the process advances to step S1613. In the above case, the CPU 401 identifies in step S1611 that there is the record 1801 of the annotation added at the time of take 1 shooting (YES in step S1611).

In step S1612, the CPU 401 selects the annotation of the preceding take. The process then returns to step S1605. In the above case, the CPU 401 selects the record 1801 of the annotation added at the time of take 1 shooting. The CPU 401 then repeats the processing from step S1605 with respect to the selected record 1801 of the annotation.

In step S1608, the camera command extraction unit 1403 extracts a camera command corresponding to the annotation information from the data storage unit 317. The process advances to step S1614. In the above case, if the CPU 401 determines in step S1607 that the shot is positive, the camera command extraction unit 1403 extracts a camera command for focus control executed at the time of take 1 shooting at the time position at which the annotation is added in step S1608.

Figure 17E:
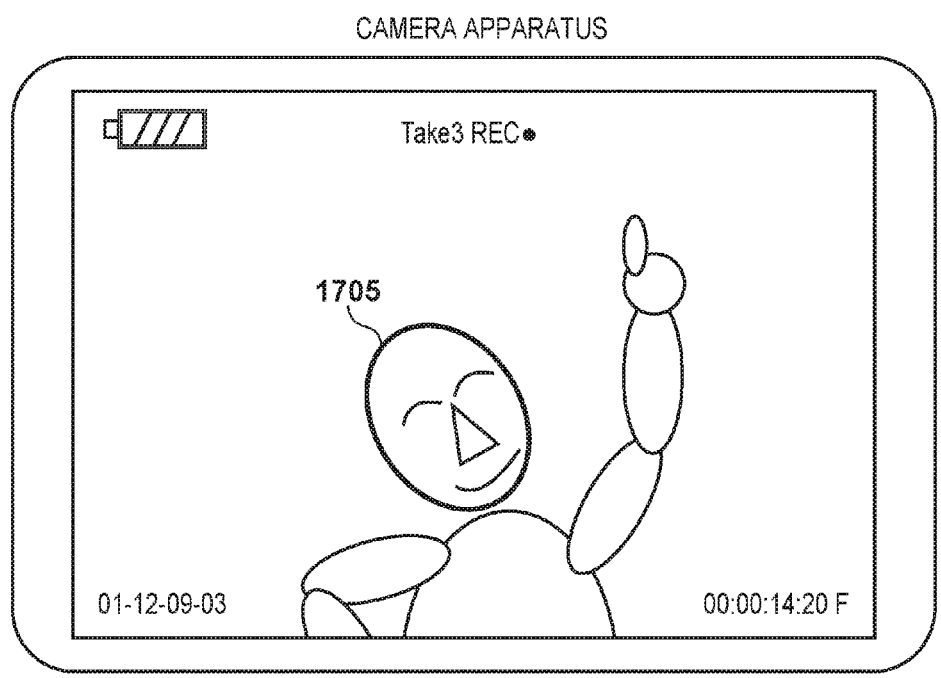
FIG. 17E is a view for explaining a screen of the camera apparatus at the time of shooting.

In step S1614, the CPU 401 transmits the extracted or generated camera command to the camera apparatus 102. In the above case, with the above processing, at the time of take 3 shooting, it is possible to perform the same focusing operation 1705 as that at the time of take 1 shooting, that is, perform shooting with a focus being directed to the face of the main character, as shown in FIG. 17E.

In step S1610, the CPU 401 generates a camera operation command as in step S805 in FIG. 8 and step S1106 in FIG. 11. The process advances to step S1614. In step S1613, the CPU 401 generates a camera display command as in step S1107 in FIG. 11. The process then advances to step S1614.

As described above, according to this embodiment, it is possible to convert pieces of annotation information added at the time of all past shot shooting operations in similar situations into camera commands. That is, when repeatedly shooting similar situations, it is possible to simultaneously implement a camera operation and its support based on an attention point at the time of shot shooting so as to be flexibly cope with a variously changing camera operation and an indication made by an annotation in each take.

In addition, in this embodiment, a camera command corresponding to the camerawork of the camera apparatus 102 at the time of shooting an image in advance is recorded in advance. When converting annotation information, if the shooting performed in advance is good, the annotation information is converted into the recorded camera command. This makes it possible to quickly convert annotation information into an optimal camera command.

Furthermore, in this embodiment, annotation information is acquired concerning each of a plurality of images shot in advance, and information of the pieces of annotation information indicating good shooting which concerns the latest acquired image is converted into the camera command recorded concerning the image. Therefore, when shooting has been performed a plurality of times in advance, it is possible to perform shooting upon reproducing good shooting conditions of the shooting conditions set for the past shooting operations.

Note that in this embodiment, pieces of annotation information are grouped based on determination whether classifications and time positions included as additional information are approximate to each other. However, such determination may be performed based on other types of additional information shown in FIG. 18. In addition, in step S1613 of generating a camera display command shown in FIG. 16, the CPU 401 may extract an associated camera command by using the camera command extraction unit 1403, and generate a display command to display a camera operation executed at the time of previous take shooting as reference information.

The present invention can provide a technique of using information added by the user to an image shot in the past for subsequent shooting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-147081, filed on Jul. 24, 2015, which is hereby incorporated by reference herein in its entirety.

What is claimed is:

1. A control apparatus comprising:
a memory; and
a processor in communication with the memory, the processor configured to provide:
an acquisition unit adapted to acquire annotation information input by a user with respect to a first image shot by a shooting unit;
an analysis unit adapted to analyze the acquired annotation information and determine whether the annotation information is a camera command generation target;
a generation unit adapted to generate a camera command defining an operation of the shooting unit based on the annotation information determined as the camera command generation target; and
a transmission unit adapted to transmit the generated camera command to the shooting unit.

2. The control apparatus according to claim 1, wherein the first image comprises moving images.

3. The control apparatus according to claim 1, further comprising:
a receiver adapted to receive the annotation information from a user with respect to the first image; and
a storage adapted to store the annotation information as the annotation information of the first image.

4. The control apparatus according to claim 1, wherein the generation unit generates the camera command based on the acquired annotation information when the annotation information includes information concerning camerawork.

5. The control apparatus according to claim 4, wherein the generation unit generates a camera command indicating a setting concerning the camerawork when the annotation information includes negative information.

6. The control apparatus according to claim 4, wherein when the annotation information includes setting information indicating a setting of camerawork, the generation unit generates a camera command indicating the setting information.

7. The control apparatus according to claim 4, wherein the generation unit generates a camera command to cause a display unit to display an image for causing the shooting unit to perform an operation, when the annotation information includes no setting information.

8. The control apparatus according to claim 4, further comprising a storage that stores a camera command concerning camerawork of the shooting unit at a time of shooting the first image,
wherein the generation unit transmits the camera command extracted by an extraction unit to the transmission unit when the annotation information indicates the shooting of the first image is positive.

9. The control apparatus according to claim 8, wherein the acquisition unit acquires the annotation information concerning each of a plurality of images each regarded as the first image,
the storage stores a camera command corresponding to camerawork of the shooting unit with respect to each of the plurality of images at the time of shooting the image, and
the generation unit transmits the camera command without generating,
wherein the processor is configured to further provide an execution unit that causes the shooting unit to execute an operation based on the camera command when shooting a second image.

10. The control apparatus according to claim 9, wherein the second image comprises an image replaceable with the first image in predetermined content.

11. A method of controlling a shooting apparatus which shoots an image by using a shooting unit, the method comprising:
acquiring annotation information input by a user with respect to a first image shot by the shooting apparatus;
analyzing the acquired annotation information and determine whether the annotation information is a camera command generation target;
generating a camera command defining an operation of the shooting unit based on the annotation information determined as the camera command generation target; and
transmitting the generated camera command to the shooting unit.

12. A non-transitory computer-readable storage medium storing a computer program for causing a computer to function as each unit of a shooting apparatus which shoots an image by using a shooting unit, the apparatus comprising:

an acquisition unit adapted to acquire annotation information input by a user with respect to a first image shot by the shooting unit;

an analysis unit adapted to analyze the acquired annotation information and determine whether the annotation information is a camera command generation target;

a generation unit adapted to generate a camera command defining an operation of the shooting unit based on the annotation information determined as the camera command generation target; and a transmission unit adapted to transmit the generated camera command to the shooting unit.

13. A shooting system comprising:

the control apparatus according to claim 1; and the shooting unit.

* * * * *